United States Patent [19]
Osuka et al.

[11] Patent Number: 5,231,962
[45] Date of Patent: Aug. 3, 1993

[54] FUEL INJECTION CONTROL SYSTEM WITH SPLIT FUEL INJECTION FOR DIESEL ENGINE

[75] Inventors: Isao Osuka, Nagoya; Satoru Sasaki, Chiryu; Mitsuru Ban; Shinnosuke Hayashi, both of Okazaki, all of Japan

[73] Assignee: Nippondenso Co., Ltd., Kariya, Japan

[21] Appl. No.: 951,196

[22] Filed: Sep. 28, 1992

[30] Foreign Application Priority Data

Sep. 27, 1991 [JP] Japan .................. 3-249357
Jul. 17, 1992 [JP] Japan .................. 4-191096

[51] Int. Cl.⁵ ............... F02D 41/06; F02M 51/06
[52] U.S. Cl. ......................... 123/299; 123/179.16
[58] Field of Search ............... 123/179.16, 179.17, 123/299, 300, 506

[56] References Cited

U.S. PATENT DOCUMENTS

| | | | |
|---|---|---|---|
| 3,690,768 | 9/1972 | Nagasawa | 123/179.17 |
| 3,827,419 | 8/1974 | Isomura | 123/179.17 |
| 4,516,550 | 5/1985 | Buck et al. | 123/179.16 |
| 4,642,773 | 2/1987 | Miyaki et al. | 364/431.05 |
| 4,653,454 | 3/1987 | Konishi et al. | 123/506 |
| 4,691,674 | 9/1987 | Otsuka et al. | 123/299 |
| 4,714,068 | 12/1987 | Nagase et al. | 123/506 |
| 4,942,307 | 7/1990 | Morishita et al. | 123/179.16 |
| 4,966,119 | 10/1990 | Mitsuyasu et al. | 123/300 X |
| 5,058,553 | 10/1991 | Kondo et al. | 123/456 |
| 5,090,379 | 2/1992 | Ito | 123/299 |

FOREIGN PATENT DOCUMENTS

| | | |
|---|---|---|
| 61-147371 | 9/1986 | Japan. |
| 1-227866 | 9/1989 | Japan. |
| 2-146256 | 6/1990 | Japan. |

*Primary Examiner*—Willis R. Wolfe
*Attorney, Agent, or Firm*—Cushman, Darby & Cushman

[57] ABSTRACT

At diesel engine startup, a fuel injection control system for the diesel engine injects a pre-jet of fuel into a combustion chamber in synchronism with a signal indicative of an angular position of the crankshaft of the diesel engine. After the pre-jet of fuel has been injected, the fuel injection control system injects a main jet of fuel which is larger in quantity than the injected pre-jet of fuel. Even when the engine rotational speed is low and subjected to variations as at engine startup, the pre-jet of fuel is reliably injected into the combustion chamber at a desired time. The pre-jet of fuel which is injected and ignited prior to the main jet develops an easily ignitable, activated condition in the combustion chamber. The subsequently injected main jet of fuel can thus be easily ignited by the activated condition in the combustion chamber. The diesel engine can be started quickly and smoothly without fail.

20 Claims, 23 Drawing Sheets

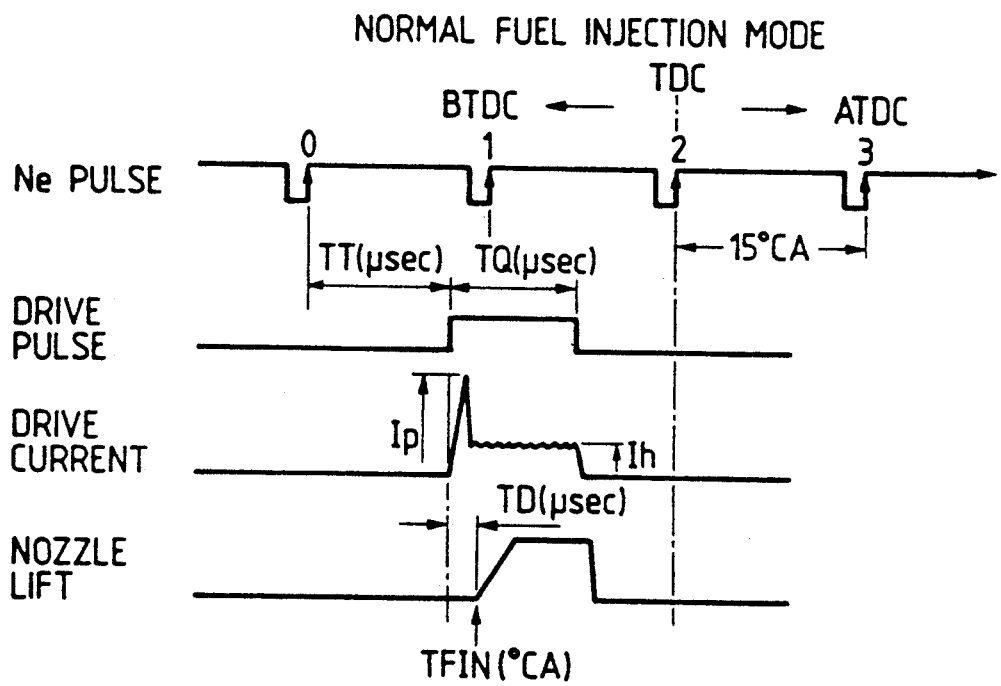
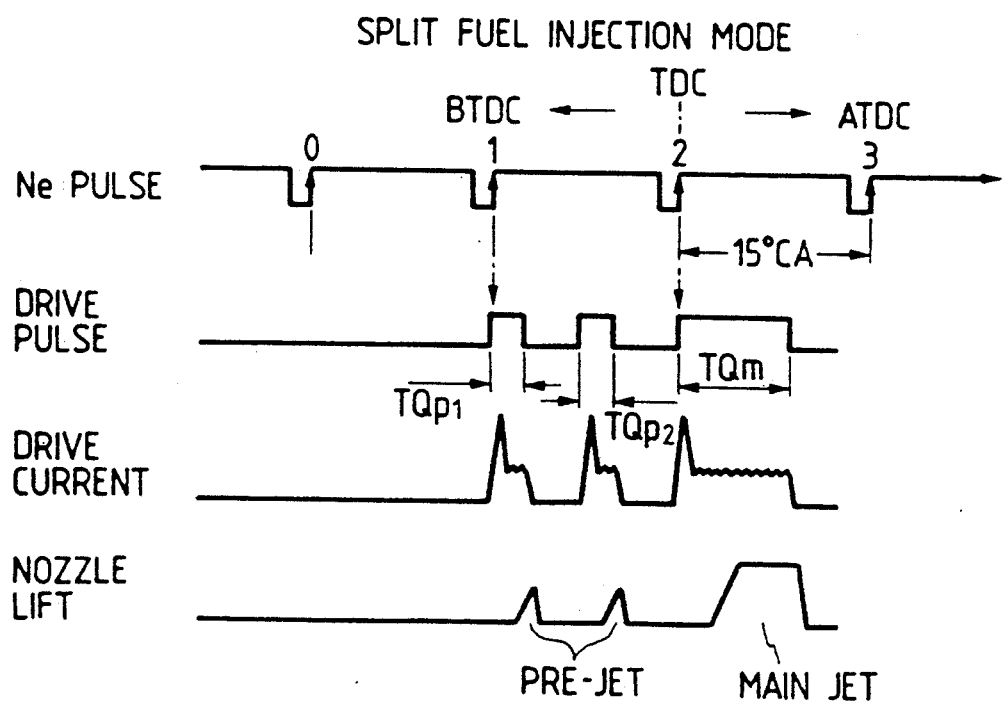

M : MISFIRE
I : IGNITED

FIG. 25
PRIOR ART
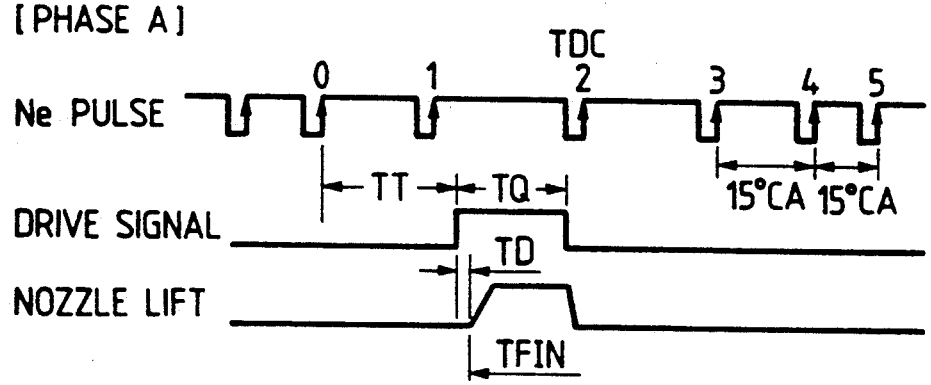
[PHASE A]
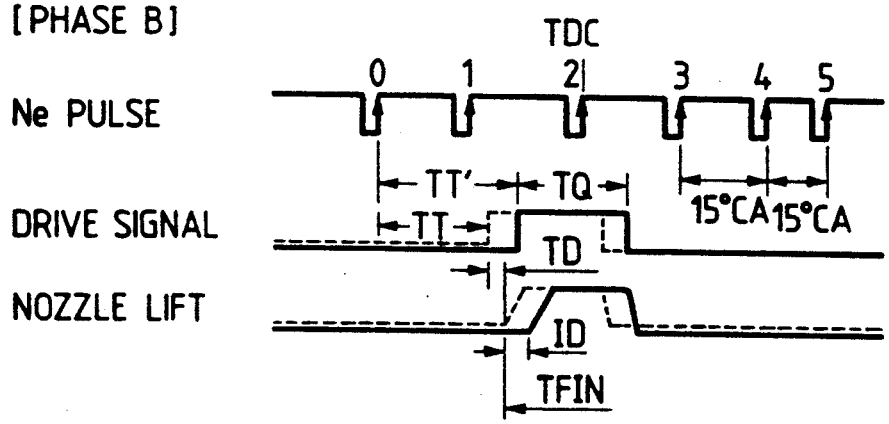
[PHASE B]

FUEL INJECTION CONTROL SYSTEM WITH SPLIT FUEL INJECTION FOR DIESEL ENGINE

BACKGROUND OF THE INVENTION

1. Field of the Invention

The present invention relates to a fuel injection control system having a split fuel injection mode for a diesel engine.

2. Description of the Prior Art

Heretofore, diesel engines are controlled by a fuel injection control system that determines the quantity of fuel to be injected into an engine cylinder and the time at which the fuel is to be injected into the engine cylinder, based on various engine conditions including the rotational speed of the engine and the accelerator opening, i.e., the throttle position or opening. In the actual control of the fuel injection timing, the fuel injection control system starts injecting the fuel a calculated period of time after a reference crankshaft angular position. For example, as shown at [PHASE A] in FIG. 25 of the accompanying drawings, if the fuel injection is to begin at a time TFIN, then the fuel injection control system, taking into account a response time delay TD of a fuel injection valve, produces a drive pulse to actuate the fuel injection valve a period of time TT after a signal 0 indicative of the reference crankshaft angular position. The period of time TT, which is to vary with the engine rotational speed Ne, is determined so that it is shorter as the engine rotational speed Ne is higher, using the engine rotational speed Ne detected for the fuel injection into a preceding cylinder. In this manner, the fuel injection control system starts injecting the fuel into the cylinder accurately at a desired crankshaft angular position. The drive pulse occurs continuously for a period of time TQ which depends upon the quantity of fuel to be injected.

When the engine is cranked at startup, the engine rotational speed increases greatly and hence varies to a large extent. Therefore, when the engine is cranked, determining the period of time TT based on the engine rotational speed detected for the fuel injection into a preceding cylinder fails to eject the fuel at a desired crankshaft angular position. As a result, the engine may not be started quickly.

FIGS. 24 and 25 of the accompanying drawings show how the engine rotational speed Ne varies upon cranking and the manner in which the fuel injection timing is controlled. In FIG. 24, the engine is cranked at an engine rotational speed of 150 rpm. At [PHASE A], the injected fuel is successfully ignited for explosion. Thereafter, the engine rotational speed Ne increases quickly, and the injected fuel fails to be ignited at [PHASE B], resulting in a misfire. The misfire is caused because, as shown at [PHASE B] in FIG. 25, the actual fuel injection timing is delayed by ID from the target fuel injection timing TFIN as a period of time TT' after which the fuel is to be injected is longer than the period of time TT due to a lower engine rotational speed detected for the fuel injection into a preceding cylinder.

When the injected fuel cannot easily be ignited under certain conditions such as cold engine startup, the above fuel injection timing error tends to cause misfires often, making it difficult for the engine to start quickly and smoothly.

FIG. 26 of the accompanying drawings shows intervals of time in which the fuel can be ignited at lower and higher temperatures. In FIG. 26, at lower temperatures, the temperature in the combustion chamber does not rise sufficiently even in the compression stroke, and an ignitable period TUPL at cold engine startup is shorter than an ignitable period TUPH at warm engine startup. At cold engine startup, therefore, it is necessary to inject the fuel into the combustion chamber exactly in the ignitable period TUPL.

For allowing the diesel engines to start quickly and smoothly, it is important that the fuel be injected at an accurate crankshaft angular position. It has however been difficult at engine startup to inject the fuel accurately with ideal timing because the engine rotational speed is low and varies in a wide range.

It is known that some diesel engines incorporate a pilot fuel injection mode in which a smaller quantity of fuel is first injected and ignited for slow burning, and then a larger quantity of fuel in injected and ignited for explosive burning. There have been made certain efforts to improve engine startup with such a pilot fuel injection process. For example, Japanese laid-open utility model publication No. 61-147371 indicates the effectiveness of the pilot fuel injection for improving diesel engine startup. However, as shown in FIG. 3(B) of this publication, since the interval between pilot and main fuel jets is short, the main fuel jet injected immediately after the pilot fuel jet cannot be ignited unless the pilot fuel jet is ignited. Under some conditions in which the fuel injection cannot be executed exactly at ideal times, as upon engine startup, even the fuel introduced by the pilot fuel jet may not be ignited. The disclosed engine startup control device therefore fails to improve the engine startup capability.

Japanese laid-open utility model publication No. 61-147371 also shows a prechamber and a glow plug for heating the prechamber to start the engine quickly particularly at lower temperatures. The disclosed diesel engine is thus relatively complex in structure, and does not produce a high output power compared with diesel engines of the direct injection type.

Another approach for improved engine startup with pilot fuel injection is disclosed in Japanese laid-open patent publication No. 1-227866. According to the disclosed fuel injection device, fuel is applied to a cylinder wall to seal the combustion chamber for improved engine startup. More specifically, a pilot fuel jet is injected before or after the piston reaches the top dead center, so that the injected fuel is applied to a cylinder wall. However, since the pilot fuel jet injected before the piston reaches the top dead center is applied to the cylinder wall, the injected pilot fuel jet does not contribute to preliminary fuel combustion prior to the main fuel jet injection. Furthermore, under certain conditions in which the fuel injection cannot be executed exactly at ideal times, as upon engine startup, the injected main fuel jet may not be ignited. The disclosed fuel injection device therefore fails to improve the engine startup capability either.

As described above, the conventional fuel injection devices suffer fuel injection timing errors at engine startup as the fuel injection timing is determined based on the time that has elapsed from the reference crankshaft angular position. The diesel engines controlled by the conventional fuel injection devices cannot start quickly and smoothly under certain conditions.

SUMMARY OF THE INVENTION

It is therefore an object of the present invention to provide a fuel injection control system for starting a diesel engine quickly and smoothly without fail.

When a diesel engine is to be started, a fuel injection control system for the diesel engine injects a pre-jet of fuel into a combustion chamber in synchronism with a signal indicative of an angular position of the crankshaft of the diesel engine. After the pre-jet of fuel has been injected, the fuel injection control system injects a main jet of fuel which is larger in quantity than the injected pre-jet of fuel. Therefore, even when the engine rotational speed is low and subjected to variations as at engine startup, the pre-jet of fuel is reliably injected into the combustion chamber at a desired time. At engine startup, the pre-jet of fuel is injected and ignited prior to the main jet to develop an easily ignitable, activated condition in the combustion chamber. The subsequently injected main jet of fuel can thus be easily ignited by the activated condition in the combustion chamber. The diesel engine can therefore be started quickly and smoothly without fail.

Normally, fuel may be injected into the combustion chamber at a time which is determined based on the angular position signal and a period of time that has elapsed from the angular position signal. The period of time that has elapsed from the angular position signal may be corrected by the rotational speed of the diesel engine to obtain a target time for injecting the fuel. The fuel injection timing in a normal fuel injection mode can therefore be adjusted highly accurately.

The fuel injection control system may inject a plurality of pre-jets of fuel at intervals of time until the main jet of fuel is injected into the combustion chamber. Each of such intervals of time between the pre-jets of fuel should preferably be shorter than a period of time in which the activated condition developed in the combustion chamber by a preceding one of the injected pre-jets of fuel remains present in the combustion chamber. A kindling developed in the combustion chamber by the preceding pre-jet of fuel is continuously maintained in the combustion chamber, for igniting the subsequently injected main jet of fuel highly reliably.

When a plurality of pre-jets of fuel are to be injected into the combustion chamber, the number of pre-jets of fuel may be determined depending on the temperature of the diesel engine or the rotational speed of the diesel engine. Consequently, the pre-jets of fuel are injected depending on an operating condition of the diesel engine for improving ignitability of the subsequently injected main jet of fuel.

The pre-jet of fuel may be injected before the piston in the combustion chamber reaches the top dead center in a compression stroke of the diesel engine. The injected pre-jet of fuel is mixed with air in the combustion chamber in the compression stroke, causing a slow oxidizing reaction called a cold flame reaction. The cold flame reaction activates the atmosphere in the combustion chamber and slightly increases the pressure in the combustion chamber. The pressure in the combustion chamber is increased by both the piston in the compression stroke and the cold flame reaction. The activated condition in the combustion chamber easily ignites the main jet of fuel that is injected into the combustion chamber subsequently to the pre-jet of fuel.

The main jet of fuel may be injected into the combustion chamber in synchronism with the angular position signal. The pre-jet of fuel may be injected into the combustion chamber prior to the main jet of fuel which is injected into the combustion chamber in synchronism with the angular position signal.

The fuel injection timing is determined differently for normal fuel injection and pre-jet fuel injection at engine startup. For the normal fuel injection, the fuel injection timing is determined based on the angular position signal and a period of time that has elapsed from the angular position signal. The period of time that has elapsed from the angular position signal depends on the rotational speed of the diesel engine, and is selected such that the fuel will be injected in a certain angular position of the crankshaft. For the pre-jet fuel injection at engine startup, the fuel injection timing is determined base on the angular position signal irrespective of the rotational speed of the diesel engine. As a consequence, even when the rotational speed varies greatly as at engine startup, the pre-jet of fuel can be injected at a relatively accurate time. The pre-jet of fuel thus injected with accurate timing is effective to improve ignitability of the subsequently injected main jet of fuel, thus improving the engine startup capability.

The time for injecting the main jet of fuel at engine startup may be determined based on the angular position signal irrespective of the rotational speed of the diesel engine. Even when the rotational speed varies greatly as at engine startup, the main jet of fuel can be injected at a relatively accurate time. The pre-jet of fuel injected prior to the main jet of fuel allows the subsequently injected main jet of fuel to be ignited reliably, thus improving the engine startup capability.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 18A is a timing chart of a normal fuel injection mode of a fuel injection control process according to the fifth embodiment;

FIG. 18B is a timing chart of a split fuel injection mode of the fuel injection control process according to the fifth embodiment;

FIG. 25 is a timing chart of a conventional fuel injection control process; and

DETAILED DESCRIPTION OF THE PREFERRED EMBODIMENTS

Figure 1:
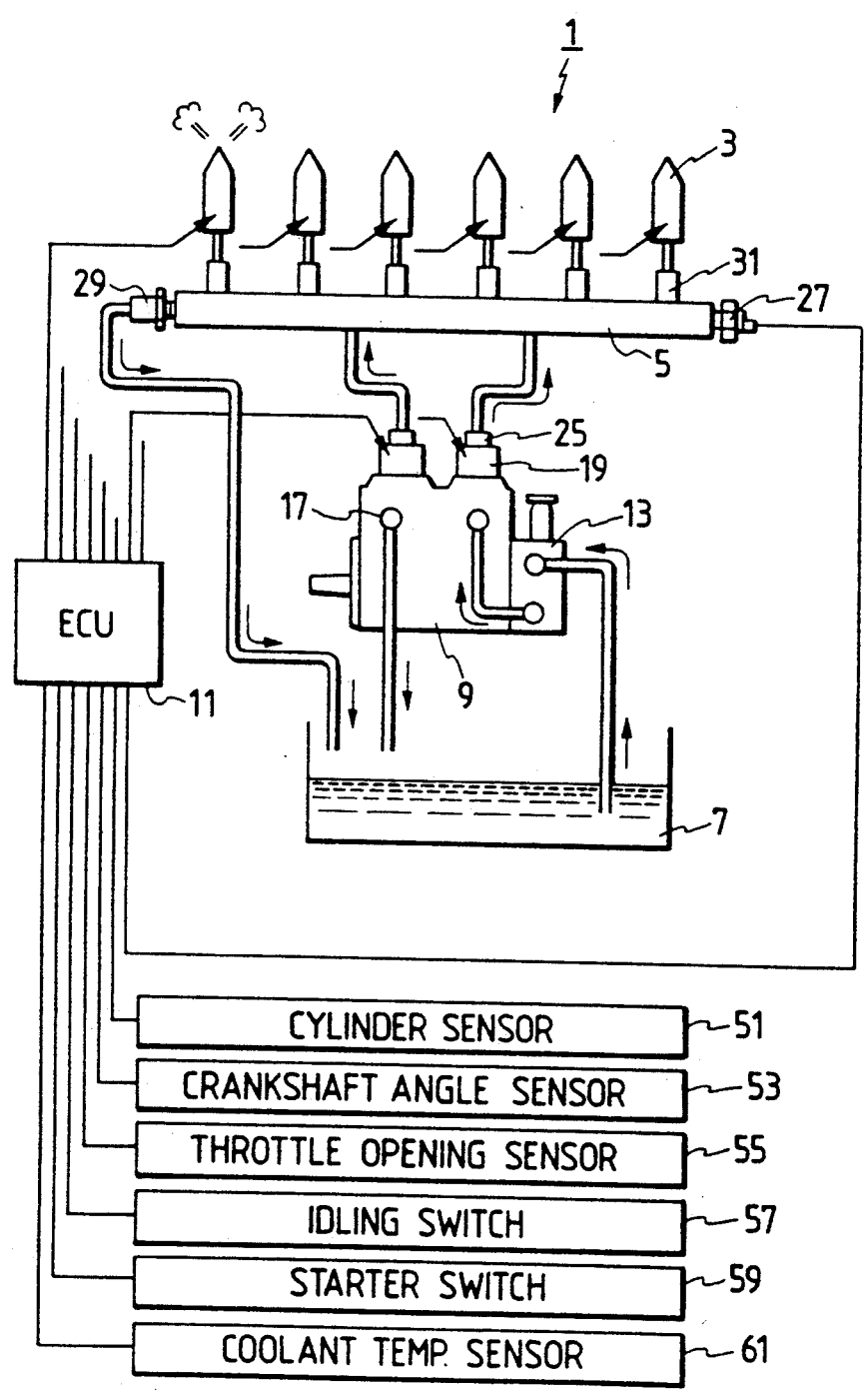
FIG. 1 is a schematic diagram, partly in block form, of a fuel injection control system according to a first embodiment of the present invention.

Like or corresponding parts are denoted by like or corresponding reference characters throughout views.

FIG. 1 shows a common-rail-type fuel injection control system having a variable-discharge-rate high-pressure fuel pump. The fuel injection system, generally designated by the reference numeral 1, is designed for use with six-cylinder diesel engines. The fuel injection system 1 generally comprises six fuel injectors 3 mounted i the respective cylinders of a diesel engine, a common rail 5 for storing fuel under pressure to be supplied to the fuel injectors 3, a variable-discharge-rate high-pressure fuel pump 9 for feeding fuel under pressure from a fuel tank 7 to the common rail 5, and an electronic control unit (ECU) 11 for controlling the fuel injectors 3 and the high-pressure fuel pump 9.

Figure 2:
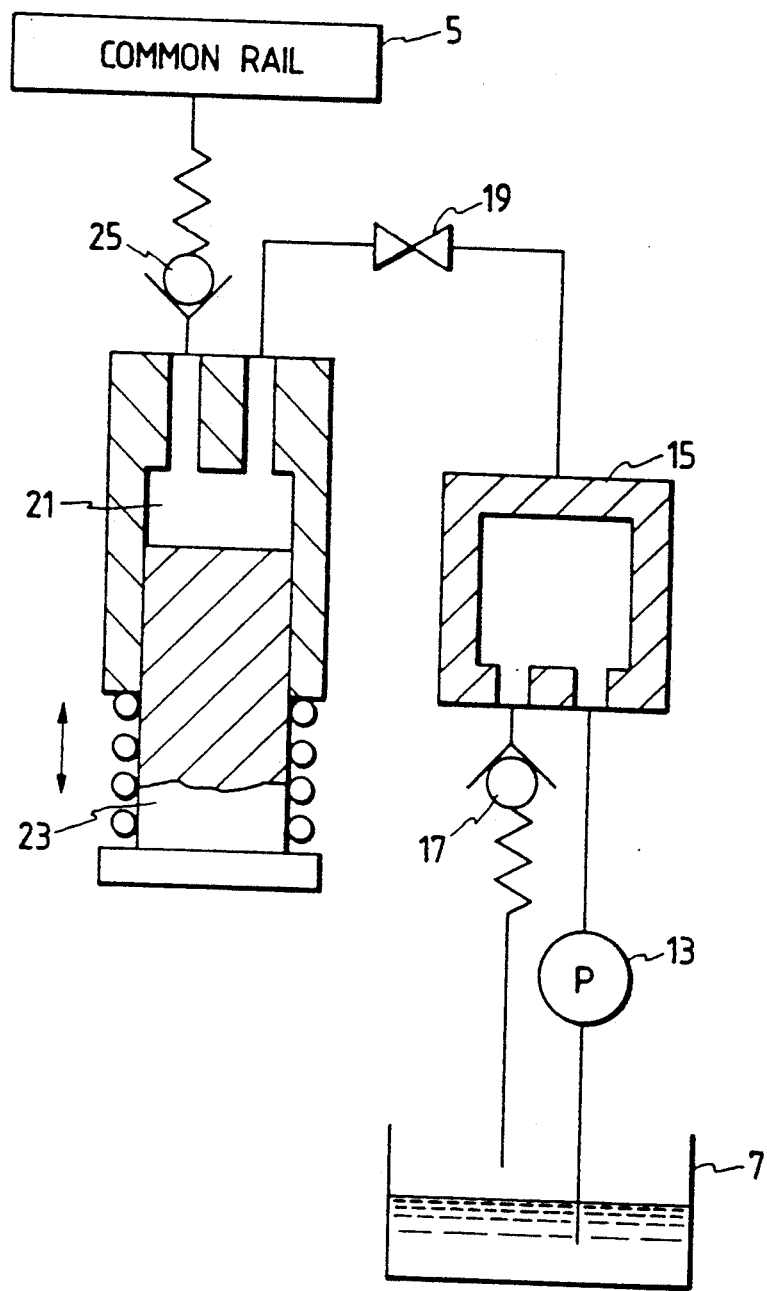
FIG. 2 is a cross-sectional view of a variable-discharge-rate high-pressure pump.

The fuel stored in the fuel tank 7 is drawn by a feed pump 13 and supplied under a low pressure to the high-pressure pump 9. The fuel supplied to the high-pressure pump 9 is stored in a fuel gallery 15 therein as shown in FIG. 2. In the fuel gallery 15, the fuel is maintained under a constant pressure by a check valve 17. When the pressure of the fuel exceeds a predetermined pressure of the check valve 17, the check valve 17 is opened, and excessive fuel returns to the fuel tank 7.

As shown in FIG. 2, the fuel gallery 15 is selectively brought into and out of communication with a fuel-pressurizing chamber 21 by a solenoid-operated on/off valve 19. A spring-loaded plunger 23 is slidably inserted in the chamber 21. The chamber 21 is connected through a check valve 25 to the common rail 5. When the solenoid-operated on/off valve 19 is closed at the time the plunger 23 moves into the chamber 21, the fuel in the chamber 21 is pressurized. As the fuel pressure builds up in excess of a predetermined pressure of the check valve 25, the fuel is supplied under pressure from the chamber 21 through the check valve 25 to the common rail 5. Therefore, the time at which the fuel is supplied under pressure from the chamber 21 to the common rail 5 depends upon the time when the solenoid-operated on/off valve 19 is closed. If the supply of the fuel under pressure form the chamber 21 to the common rail 5 always stops when the plunger 25 reaches the top dead center in the chamber 21, then the quantity of fuel supplied from the chamber 21 to the common rail 5 is greater as the fuel starts to be supplied earlier. The ECU 11 controls the time to close the solenoid-operated on/off valve 19 to achieve a target fuel pressure in the common rail 5.

The high-pressure fuel pump 9 and its associated components described above will not be described in detail below with respect to their operation as they do not have a direct bearing on the present invention. For further details, reference should be made to Japanese laid-open patent publication No. 2-146256 (U.S. Pat. No. 5,058,553).

As described above, the fuel is fed under pressure to the common rail 5 by the high-pressure pump 5 and stored in the common rail 5. As shown in FIG. 1, the fuel pressure in the common rail 5 is detected by a common rail pressure sensor 27 attached to the common rail 5, and an electric signal produced by the common rail pressure sensor 27 as indicating the detected pressure is sent to the ECU 11. The ECU 11 controls the time to close the solenoid-operated on/off valve 19 to equalize the fuel pressure in the common rail 5 to the target fuel pressure in the common rail 5. A pressure limiter 29 is mounted on the common rail 5 to release the fuel from the common rail 5 into the fuel tank 7 when the fuel pressure in the common rail 5 becomes excessively high.

Figure 3:
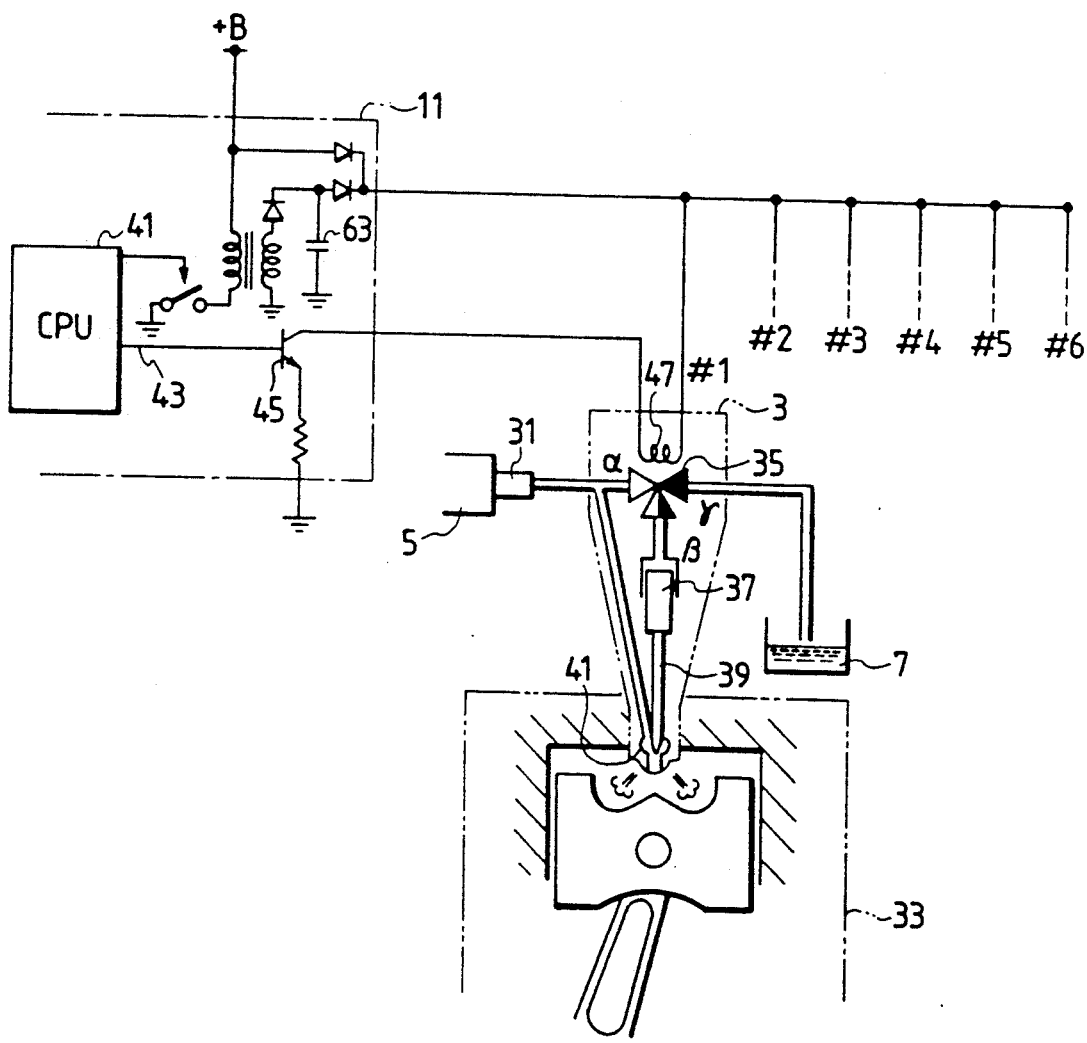
FIG. 3 is a schematic diagram of a fuel injector.

As shown in FIG. 3, the high-pressure fuel stored in the common rail 5 is then delivered through a flow limiter 31 to each of the fuel injectors 3 mounted in the respective cylinders of the diesel engine, designated by the reference numeral 33. The fuel delivered to the fuel injector 3 is branched to flow in two directions. Specifically, the fuel flows through ports α, β of a three-way valve 35 to the back of a command piston 37 to which a needle 39 is connected, and also flows into a fuel reservoir 41 at the lower tip end of the needle 39 in bypassing relationship to the three-way valve 35 and the command piston 37. Accordingly, the fuel supplied under pressure to and branched in the fuel injector 3 exerts a force tending to lower the needle 39 toward the cylinder and a force tending to lift the needle 39 away from the cylinder. Since the back of the command piston 37 has a pressure-bearing surface area greater than that of the tip end of the needle 39, the net force applied to the needle 39 by the delivered fuel is directed downwardly, keeping the needle 39 closed. Consequently, when the three-way valve 35 is in the illustrated position allowing communication from the port α to the port β, the fuel injector 3 does not inject fuel into the cylinder.

The fuel injector 3 is controlled by the ECU 11 for fuel injection as follows: The ECU 11 includes a central processing unit (CPU) 41 which sends an ON signal to an output port 43 thereof for a predetermined period of time at a time that is determined in a manner described later on. When the ON signal is applied to the output port 43, a transistor 45 of the ECU 11 is rendered conductive, energizing a solenoid coil 47 of the three-way valve 35. The three-way valve 35 is now shifted to bring the port β out of communication with the port α and into communication with a port β connected to the fuel tank 7. No fuel pressure from the common rail 5 is applied to the back of the command piston 37, and the high-pressure fuel that has been delivered to the back of the command piston 37 is released through the ports β, γ to the fuel tank 7. The back pressure on the command piston 37 decreases. The net force applied to the needle 39 is directed upwardly, lifting the needle 39. The nozzle of the fuel injector 3 is now opened, starting to inject fuel into the cylinder.

To carry out the above fuel injection and various other control modes, the ECU 11 is supplied with detected signals from various engine condition sensors which include, as shown in FIG. 1, a cylinder sensor 51, a crankshaft angle sensor 53, a throttle opening sensor 55, an idling switch 57, a starter switch 59, a coolant temperature sensor 61, as well as the common rail pressure sensor 27. The cylinder sensor 51 produces a pulse signal when the crankshaft of the diesel engine 33 reaches a predetermined angular position, thereby detecting when the piston in a certain engine cylinder is in a predetermined position in its stroke. The crankshaft angle sensor 53 produces a pulse signal each time the crankshaft rotates through a predetermined angle. In this embodiment, the crankshaft angle sensor 53 produces a pulse signal each time the crankshaft rotates through an angle of 15°. The throttle opening sensor 55 detects when the throttle valve of the diesel engine 3 is open. The idling switch 57 detects when the diesel engine 3 is idling. The starter switch 59 detects when an engine starter for starting the diesel engine 3 is turned on. The coolant temperature sensor 61 detects the temperature of the coolant of the diesel engine 3.

As shown in FIG. 3, the ECU 11 includes a capacitor 63 connected in a circuit from a battery +B to the solenoid coil 47. Immediately after the transistor 45 is turned on, a peak current Ip (see FIG. 4A) flows through the solenoid coil 47 due to electric charges stored in the capacitor 63. Then, a constant current Ih flows through the solenoid coil 47 from the battery +B. Therefore, the capacitor 63 serves to quickly energize the solenoid coil 47 when the transistor 45 is turned on.

After elapse of a target energization time TQ (described later on), the solenoid coil 47 is de-energized, bringing the ports α, β back into communication with each other. Under a high back pressure, the command piston 37 now displaces the needle 39 downwardly to close the fuel injector nozzle, finishing the fuel injection.

A fuel injection control process carried out by the fuel injection control system will be described below.

Figure 5:
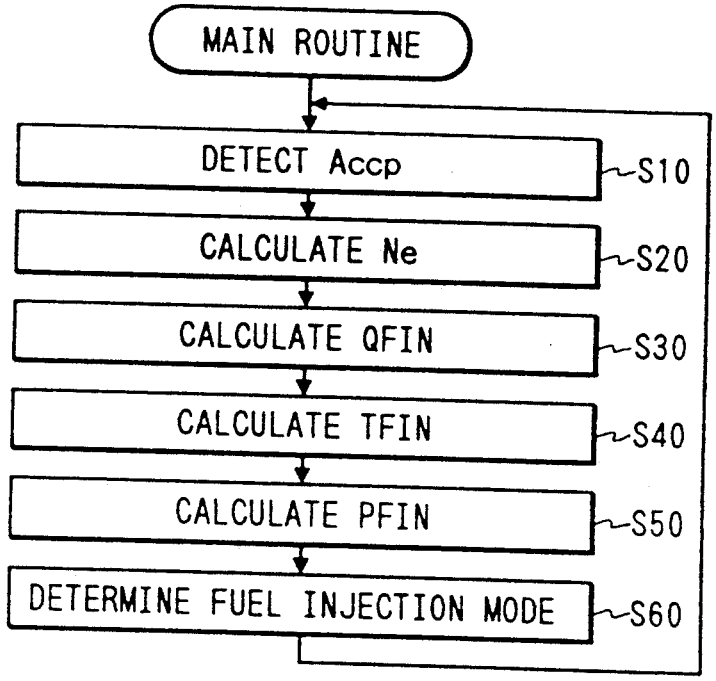
FIG. 5 is a flowchart of a main routine of the fuel injection control process.
Figure 6:
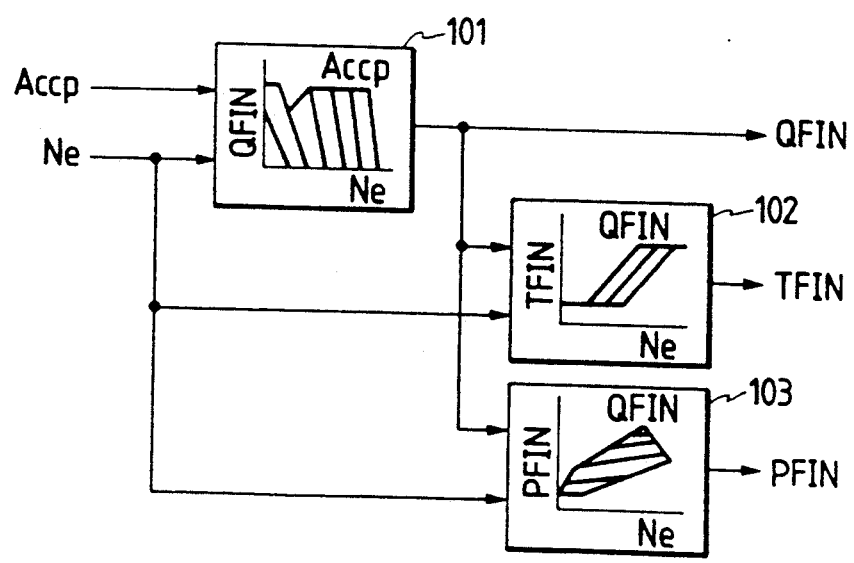
FIG. 6 is a diagram showing maps used by the main routine.

The CPU 41 of the ECU 11 executes a main routine of the fuel injection control process as shown in FIG. 5. First, the CPU 41 calculates a throttle opening Accp based on the detected signal from the throttle opening sensor 55 in a step S10. Then, the CPU 41 calculates, in a step S20, an engine rotational speed Ne based on a pulse signal which is supplied from the crankshaft angle sensor 53 each time the crankshaft rotates through 15° (15° CA=crankshaft angle). The engine rotational speed Ne may be calculated according to a known method by measuring the time that has elapsed between two successive pulses from the crankshaft angle sensor 53. Thereafter, in a step S30, the CPU 41 determines a target fuel quantity QFIN from a governor pattern map 101 as shown in FIG. 6, using the throttle opening Accp and the engine rotational speed Ne as parameters. The step S30 is followed by a step S40 in which the CPU 41 determines a target fuel injection timing TFIN from a timing map 102 as shown in FIG. 6, using the engine rotational speed Ne and the target fuel quantity QFIN as parameters. Then, the CPU 41 determines in a step S50 a target common rail pressure PFIn from a pressure map 103 as shown in FIG. 6, using the engine rotational speed Ne and the target fuel quantity QFIN as parameters. Thereafter, control goes to a step S60 which determines a fuel injection mode.

Figure 7:
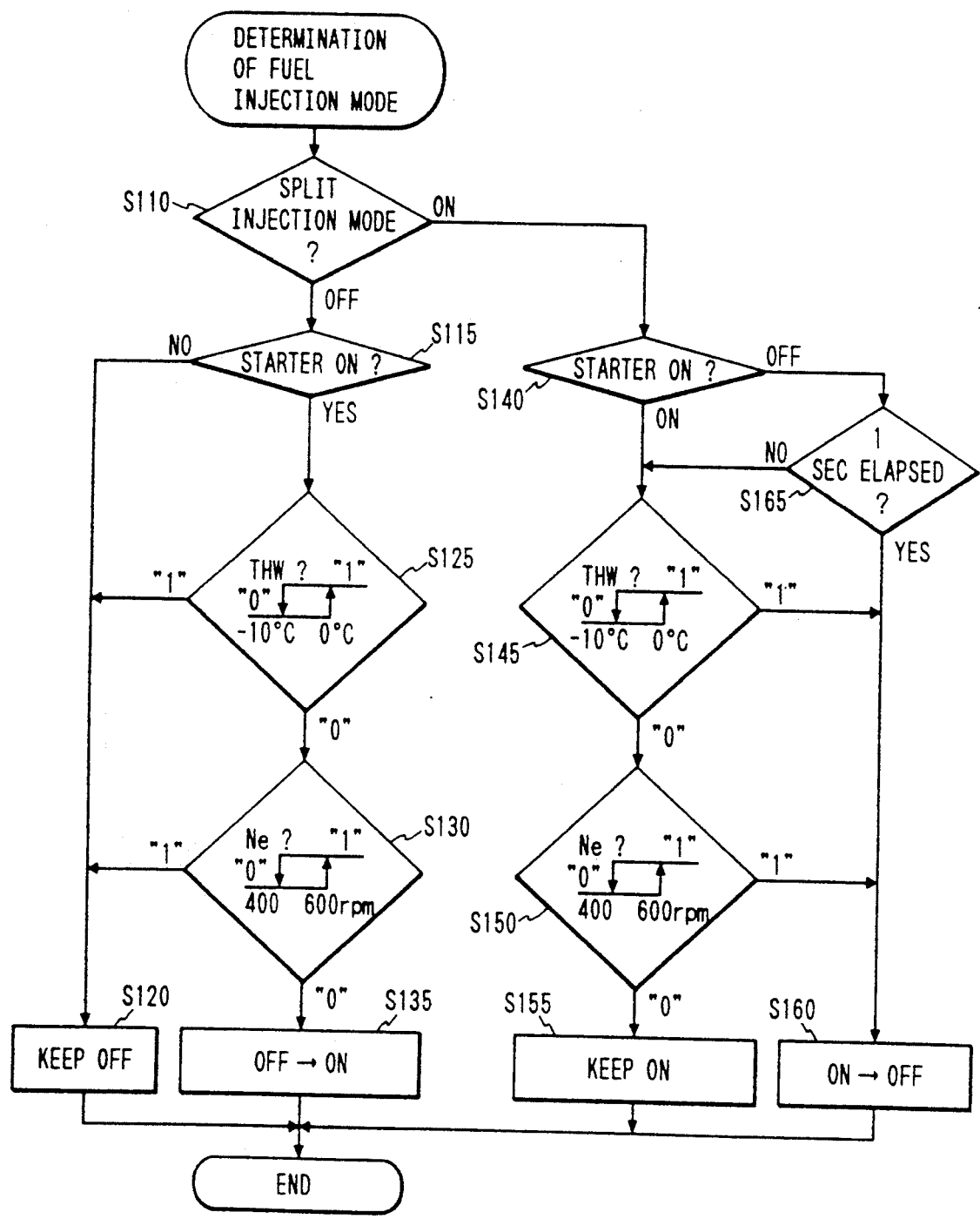
FIG. 7 is a flowchart of a process for determining a fuel injection mode.

The step S60 for determining a fuel injection mode is carried out according to a process shown in FIG. 7. In the process shown in FIG. 7, the CPU 41 checks if a normal fuel injection mode or a split fuel injection mode is to be carried out In the normal fuel injection mode, fuel is continuously injected into the cylinder by the fuel injector 3. In the split fuel injection mode, two separate fuel jets, i.e., a pre-jet and a main jet, are injected into the cylinder by the fuel injector 3.

According to the process shown in FIG. 7, the CPU 41 determines whether the split fuel injection mode is enabled (ON) or disabled (OFF) in a step S110. If the split fuel injection mode is OFF, then the CPU 41 determines whether the engine starter is turned on or not based on the signal from the starter switch 59 in a step S115. If the engine starter is not turned on, the CPU 41 keeps the split fuel injection mode OFF in a step S120. If the engine starter is turned on in the step S115, then the CPU 41 determines whether the coolant temperature THW satisfies a predetermined condition or not in a step S125.

The condition used in the step S125 has hysteresis characteristics to make the process shown in FIG. 7 stable. Specifically, in a first execution of the step S125, the CPU 41 produces a result "0" if the coolant temperature THW is 0° C. or lower, and a result "1" if the coolant temperature THW is higher than 0° C. The result "0" or "1" is stored until a next execution of the step S125. In second and following executions of the steps S125, when the stored result from the previous execution is "1," the CPU 41 produces the result "0" if the coolant temperature THW is −10° C. or lower, and when the stored result from the previous execution is "0," the CPU 41 produces the result "1" if the coolant temperature THW is higher than 0° C. If the CPU 41 produces the result "1" in the step S125, then control goes from the step S125 to the step 120 in which the split fuel injection mode remains OFF. On the other hand, if the CPU 41 produces the result "0" in the step S125, then control goes from the step S125 to a step S130.

In the step S130, the CPU 41 determines whether the engine rotational speed Ne satisfies a predetermined condition or not. The condition used in the step S130 also has hysteresis characteristics to make the process stable. Specifically, in a first execution of the step S130, the CPU 41 produces a result "0" if the engine rotational speed Ne is 600 rpm or lower, and a result "1" if the engine rotational speed Ne is higher than 600 rpm. The result "0" or "1" is stored until a next execution of the step S130. In second and following executions of the steps S130, when the stored result from the previous execution is "1," the CPU 41 produces the result "0" if the engine rotational speed Ne is 400 rpm or lower, and when the stored result from the previous execution is "0," the CPU 41 produces the result "1" if the engine rotational speed Ne is higher than 600 rpm. If the CPU 41 produces the result "1" in the step S130, then control goes from the step S130 to the step 120 in which the split fuel injection mode remains OFF. On the other hand, if the CPU 41 produces the result "0" in the step S130, then control goes from the step S130 to a step S135. In the step S135, the CPU 41 now turns the split fuel injection mode ON.

If the split fuel injection mode is ON in the step S110, then the CPU 41 carries out steps S140, S145, S150, S155, S160 which are identical to the steps S115, S125, S130, S120, S135 respectively. If the engine starter is turned off in the step S140, then the CPU 41 determines whether one second has elapsed or not after the engine starter has been turned off in a step S165. Only after one second has elapsed, control goes from the step S165 to the step S160. Therefore, since the split fuel injection mode is not immediately turned OFF after the engine starter is turned off, the process shown in FIG. 7 is rendered stable.

According to the process shown in FIG. 7, therefore, when the diesel engine is started or for one second immediately after the diesel engine is started, the split fuel injection mode is turned ON if the coolant temperature THW is lower than a predetermined value and also the engine rotational speed Ne is lower than a predetermined value. Otherwise, the normal fuel injection mode is turned enabled (ON).

A process of controlling the fuel injector 3 for injecting fuel into the cylinder will be described below. The fuel injector 3 is controlled according to an interrupt routine shown in FIG. 8.

Figure 4A:
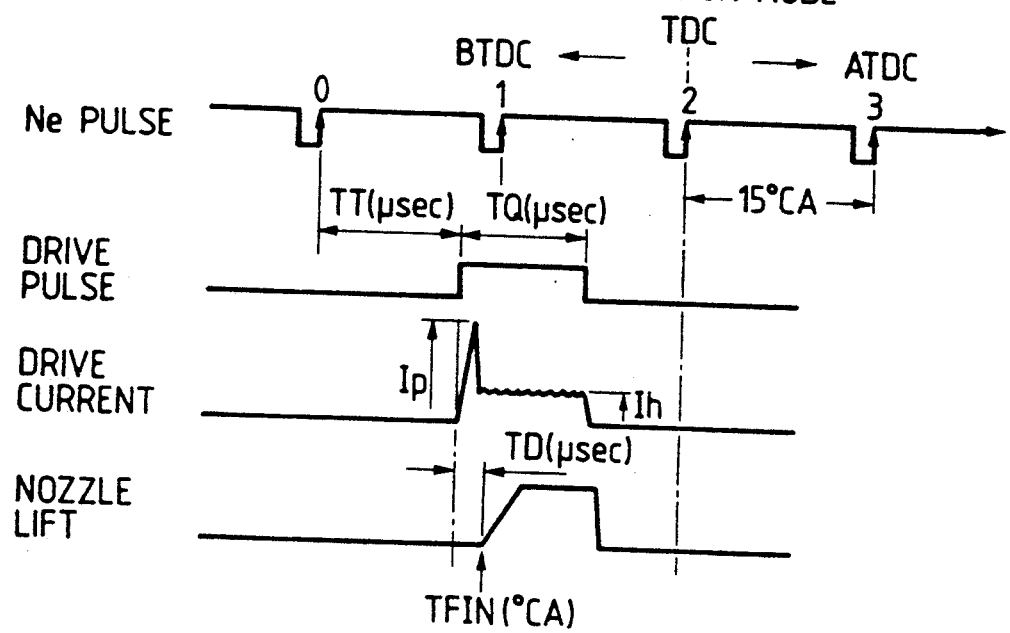
FIG. 4A is a timing chart of a normal fuel injection mode of a fuel injection control process carried out by the fuel injection control system.
Figure 8:
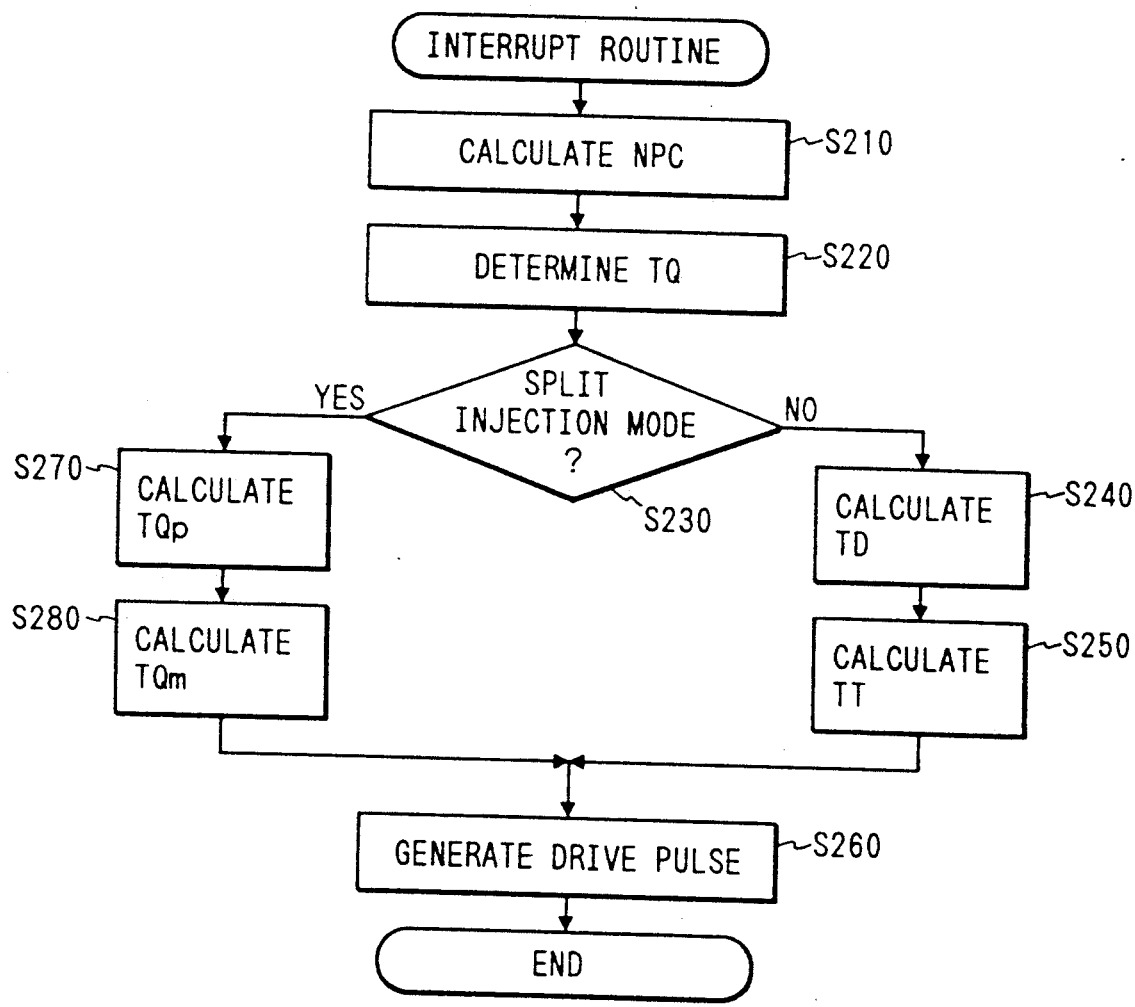
FIG. 8 is a flowchart of an interrupt routine for controlling a fuel injector.
Figure 9:
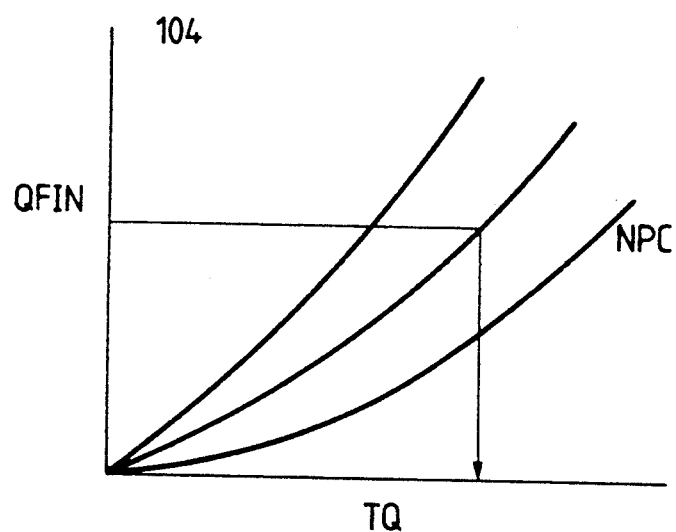
FIG. 9 is a graph showing a map for determining a target energization period.
Figure 10:
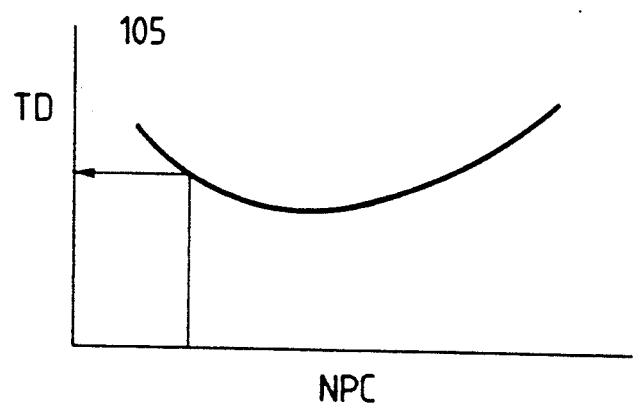
FIG. 10 is a graph showing a map for determining an injector operation time delay.

The interrupt routine shown in FIG. 8 is carried out periodically in synchronism with the rotation of the crankshaft. In the interrupt routine, the CPU 41 calculates an actual fuel pressure NPC in the common rail 5 based on the detected signal from the common rail pressure sensor 27 in a step S210. Then, the CPU 41 determines, in a step S220, a target energization period TQ from an energization period map 104 shown in FIG. 9, using the target fuel quantity QFIN and the actual fuel pressure NPC as parameters. The CPU 41 subsequently determines whether the split fuel injection mode is ON or OFF in a step S230. If the split fuel injection mode is OFF, then the CPU 41 determines, in a step S240, an injector operation time delay TD from a time delay map 105 shown in FIG. 10. The injector operation time delay TD is an interval of time which is consumed after a drive pulse starts to be applied from the ECU 11 to the solenoid coil 47 and until the nozzle of the fuel injector 3 is actually opened. Then, as shown in FIG. 4A, the CPU 41 calculates a target period of time TT after which the control pulse is to be applied to start energizing the solenoid coil 47, from a reference Ne pulse No. 0 generated by the crankshaft angle sensor 53, according to the following equation:

$$TT[\mu sec] = \frac{(30\,[^\circ CA] - TFIN\,[^\circ CA]*10^6)}{6*Ne\,[rpm]} - TD\,[\mu sec]. \quad (1)$$

The above equation is established so as to achieve the target fuel injection timing TFIN expressed in terms of a crankshaft angle, irrespective of whether the engine rotational speed Ne is high or low. Then, the CPU 41 generates a drive pulse using the target time period TT and the target energization period TQ in a step S260.

If the split fuel injection mode is ON in the step S230 in FIG. 8, then the CPU 41 calculates a period of time TQp in which to inject the pre-jet in a step S270. An experiment conducted by the inventors has indicated that the optimum ratio of time periods respectively for the pre-jet and the main jet of fuel is 1:3. In this embodiment, the time period TQp (also referred to as a "pre-jet time period TQp") is selected to be ¼ of the target energization period TQ determined in the step S220.

Then, the CPU 41 calculates a period of time TQm in which to inject the main jet in a step S280. Since the time period TQm (also referred to as a "main jet time period TQm") should preferably be three times the pre-jet time period TQp, as described above, the main jet time period TQm would be expressed by TQm=3*TQp. However, the high-voltage energy charged by the capacitor 63 (see FIG. 3) is discharged when the pre-jet is injected from the fuel injector 3, the peak current Ip is not available for injecting the main jet. In view of this limitation, a corrective time period "C" is added to calculate the main jet time period TQm. Consequently, the pre-jet time period TQp and the main jet time period TQm are calculated as follows:

$$TQp = (\tfrac{1}{4})*TQ \quad (2).$$

$$TQm = (\tfrac{3}{4})*TQ + C \quad (3).$$

Figure 4B:
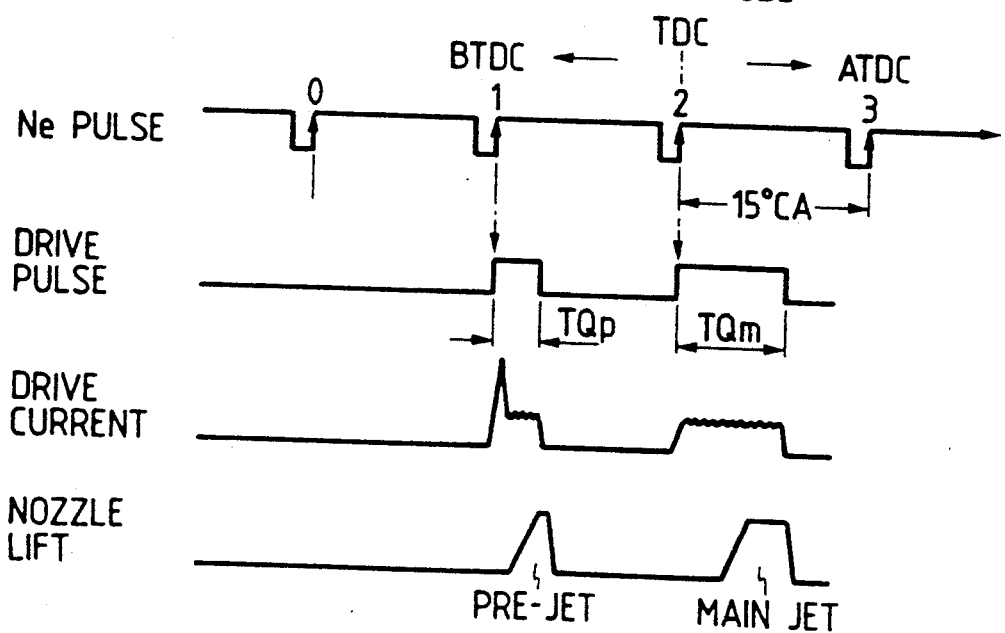
FIG. 4B is a timing chart of a split fuel injection mode of the fuel injection control process.

Based on the pre-jet and main jet time periods TQp, TQm thus calculated, the CPU 41 generates, in a step S260, drive pulses respectively in synchronism with an Ne pulse No. 1 (BTDC) which occurs 15° CA before TDC (top dead center) and an Ne pulse No. 2 at TDC, as shown in FIG. 4B.

As described above, the normal fuel injection mode is shown in FIG. 4A and the split fuel injection mode is shown in FIG. 4B. Each of FIGS. 4A and 4B shows a pulse signal (Ne pulses) generated by the crankshaft angle sensor 53, a drive pulse applied to the fuel injector 3 from the output port of the ECU 11, a drive current which flows through the solenoid coil 47 when the drive pulse is applied to the fuel injector 3, and a nozzle lift, i.e., the lift of the nozzle of the fuel injector 3.

In FIG. 4A, the fuel injection timing in the normal fuel injection mode is determined by the Ne pulse signal No. 0 and the target time period TT. In FIG. 4B, the pre-jet time period TQp in the split fuel injection mode starts in synchronism with the Ne pulse No. 1 which occurs 15° CA before TDC, and the main jet time period TQm in the split fuel injection mode starts in synchronism with the Ne pulse No. 2 which occurs at TDC. In the normal fuel injection mode, the fuel injection timing is established in relation to the target time period TT as corrected by the engine rotational speed Ne, and the fuel is injected into the cylinder from the fuel injector 3 at the target fuel injection timing TFIN irrespective of the engine rotational speed. In the split fuel injection mode, the pre-jet injection timing and the main jet injection timing are established in synchronism with the Ne pulses Nos. 1 and 2. Therefore, even upon engine startup at which the engine rotational speed varies greatly, the pre-jet and the main jet of fuel are injected into the cylinder reliably at desired crankshaft angular positions that are indicated by the Ne pulses Nos. 1 and 2.

The split fuel injection mode is selected when the diesel engine starts at low temperatures. A small amount of pre-jet fuel injected into the cylinder does not lower the temperature of air in the cylinder with the heat of vaporization. The injected pre-jet fuel is ignited, producing a "kindling" for igniting main-jet fuel which is subsequently injected into the cylinder. The subsequently injected main-jet fuel is then reliably ignited and burned upon contact with the kindling produced by the ignition of the pre-jet fuel. Though the engine rotational speed is subsequently increased rapidly, the fuel injected into the cylinder can thus be combusted stably without misfires. As a result, the diesel engine can be started quickly and smoothly.

Figure 11:
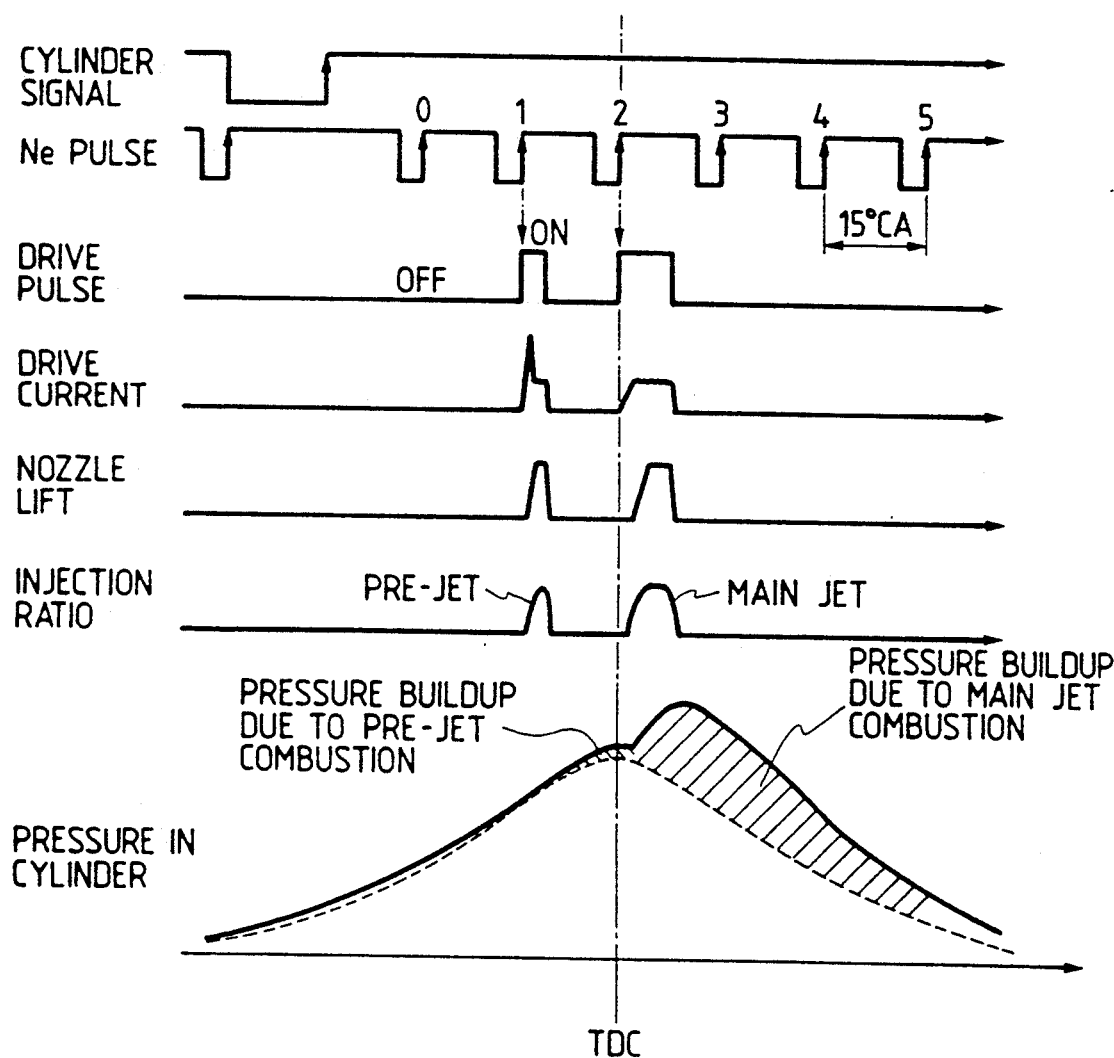
FIG. 11 is a diagram showing the relationship between the split fuel injection and the pressure in a cylinder.

FIG. 11 shows a detected signal from the cylinder sensor 51, a pulse signal (Ne pulses) generated by the crankshaft angle sensor 53, a drive pulse applied to the fuel injector 3 from the output port of the ECU 11, a drive current which flows through the solenoid coil 47 when the drive pulse is applied to the fuel injector 3, a nozzle lift, a ratio of fuel injection from the fuel injector 3, and the pressure in the cylinder. The compressive pressure in the cylinder as it is developed by reciprocating movement of the piston in the cylinder is indicated by the dotted line in FIG. 11. The combustion pressure in the cylinder as it is developed by the combustion of fuel therein is shown hatched in FIG. 11. As shown in FIG. 11, the overall pressure in the cylinder is slightly higher than the compressive pressure when the pre-jet of fuel is burned in the cylinder. The combustion of the pre-jet of fuel gradually takes place as the amount of pre-jet fuel is small and the compressive pressure in the cylinder is not high. The gradual combustion is called a cold flame reaction which may be defined as a slow oxidizing reaction. The cold flame reaction is effective to develop an easily ignitable, activated condition in the cylinder, which may be called a "kindling" for igniting a subsequently injected main jet of fuel. In this embodiment, the pre-jet and the main jet are separated from each other by 15° CA. Such an interval should preferably be longer than a period of time in which the cold flame reaction caused by the combustion of the pre-jet is sufficiently developed, and simultaneously be shorter than a period of time in which the easily ignitable, activated condition remains present in the cylinder when the main jet is injected, because the cold flame reaction diminishes quickly after its full development.

In the conventional pilot fuel injection, a pre-jet of fuel is injected immediately prior to a main jet of fuel and burned explosively, and thereafter the main jet of fuel is injected and burned explosively to increase the pressure in the cylinder gradually from the explosive combustion of the pre-jet of fuel. In the split fuel injection mode according to the present invention, however, the interval between the pre-jet and the main jet of fuel is relatively long, and the injected pre-jet of fuel is gradually burned, causing the injected main jet of fuel to be burned explosively. Therefore, the pressure in the cylinder is increased quickly from the combustion of the main-jet of fuel. Inasmuch as the gradual combustion of the pre-jet of fuel is sufficiently effective to ignite the subsequent main jet of fuel highly reliably, it is not necessary to adjust the fuel injection timing as precisely as is the case with the conventional pilot fuel injection. As a consequence, the engine can be started easily at low temperatures even with the pre-jet and the main jet of fuel being injected at a resolution of 15° CA. If the fuel injection timing were controlled solely based on a signal indicative of the crankshaft angular position, a resolution of about 0.5° CA would be required to achieve necessary fuel injection timing accuracy. A crankshaft angle sensor of such a high resolution would not easily be manufactured as its pulser would require up to 720 teeth. According to the present invention, however, the split fuel injection mode improves cold engine startup using a crankshaft angle sensor of a relatively low resolution.

The above advantages can be accomplished because not only the split fuel injection mode is performed at cold engine startup, but also the pre-jet of fuel is first injected prior to TDC. Since the pre-jet fuel injection is synchronous with the rotation of the crankshaft, the split fuel injection mode can be carried out stably with accurate timing even when the engine rotational speed varies greatly as upon engine cranking. Accordingly, the engine startup capability is improved stably at all times.

The engine startup capability may be impaired as by racing even after the engine is cranked. According to a second embodiment of the present invention which will be described below, the cold engine startup capability is improved upon engine cranking and subsequently to engine cranking.

The second embodiment is the same as the first embodiment described above as to the fuel injection control system hardware, the main routine, and the interrupt routine, but differs from the first embodiment with respect to the process for determining a fuel injection mode.

Figure 12:
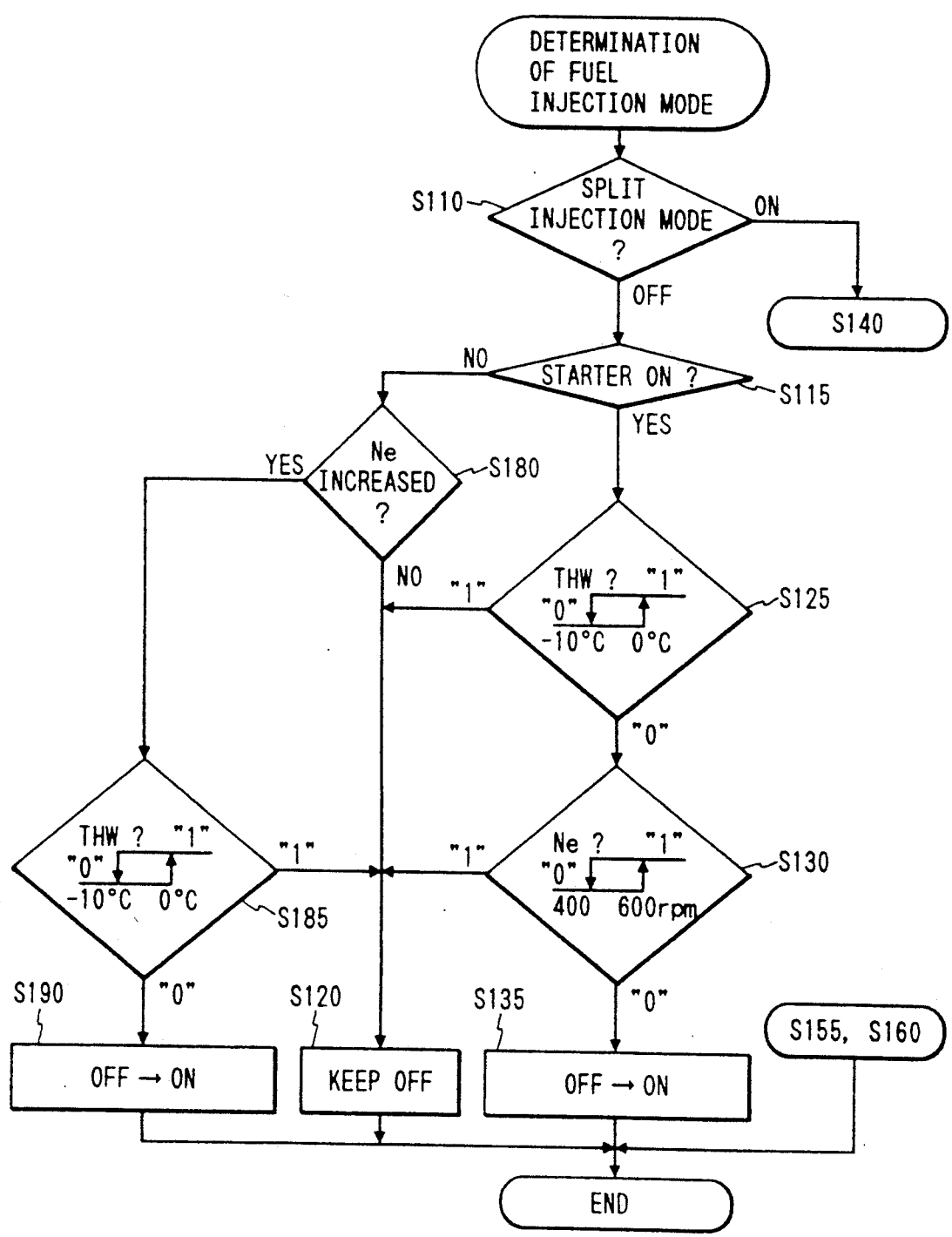
FIG. 12 is a flowchart of a process for determining a fuel injection mode according to a second embodiment of the present invention.

FIG. 12 shows a process for determining a fuel injection mode according to the second embodiment. Those steps of FIG. 12 which are identical to those shown in FIG. 7 are denoted by identical reference characters. As shown in FIG. 12, if the slip fuel injection mode is OFF in the step S110, and also if the engine starter is turned off in the step S115, then the CPU 41 determines whether the engine rotational speed Ne rapidly increases or not in a step S180. If the engine rotational speed Ne does not rapidly increase, then the split fuel injection mode is kept OFF in the step S120. If engine rotational speed Ne rapidly increases in the step S180, then the CPU 41 determines the condition for the coolant temperature THW in a step S185, as with the step S125. If the CPU 41 produces the result "0" in the step S185, then it turns the split fuel injection mode ON in a step S190. Therefore, when the racing occurs to the diesel engine at cold engine startup before engine idling stabilizes, the split fuel injection mode is carried out to prevent misfires from happening when the engine rotational speed varies greatly.

In the above embodiments, the split fuel injection mode is controlled on the basis of the engine starter signal, the engine rotational speed, and the coolant temperature. However, an intake air temperature or an intake air pressure may also be added as a parameter to control the split fuel injection mode.

In the above split fuel injection mode, two fuel jets are separately injected into the cylinder. However, three or more fuel jets may separately be injected into the cylinder. The ratio of time periods respectively for the pre-jet and the main jet of fuel may be other than 1:3 depending on the displacement or other parameters of the diesel engine.

Figure 13:
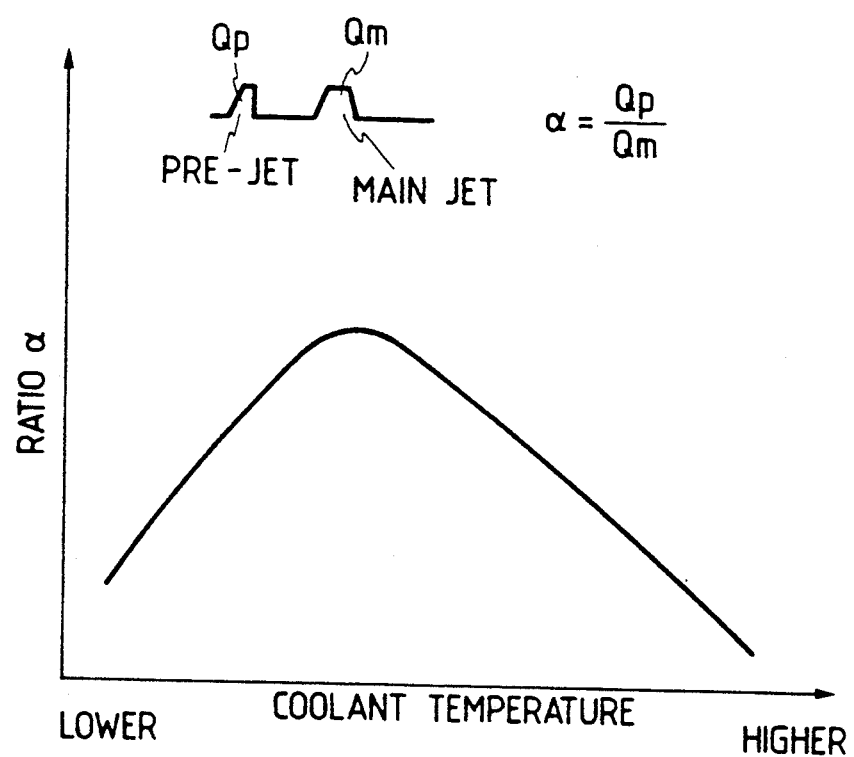
FIG. 13 is a graph showing a map for determining the ratio of fuel jets to be injected in a split fuel injection mode according to a third embodiment of the present invention.
Figure 14:
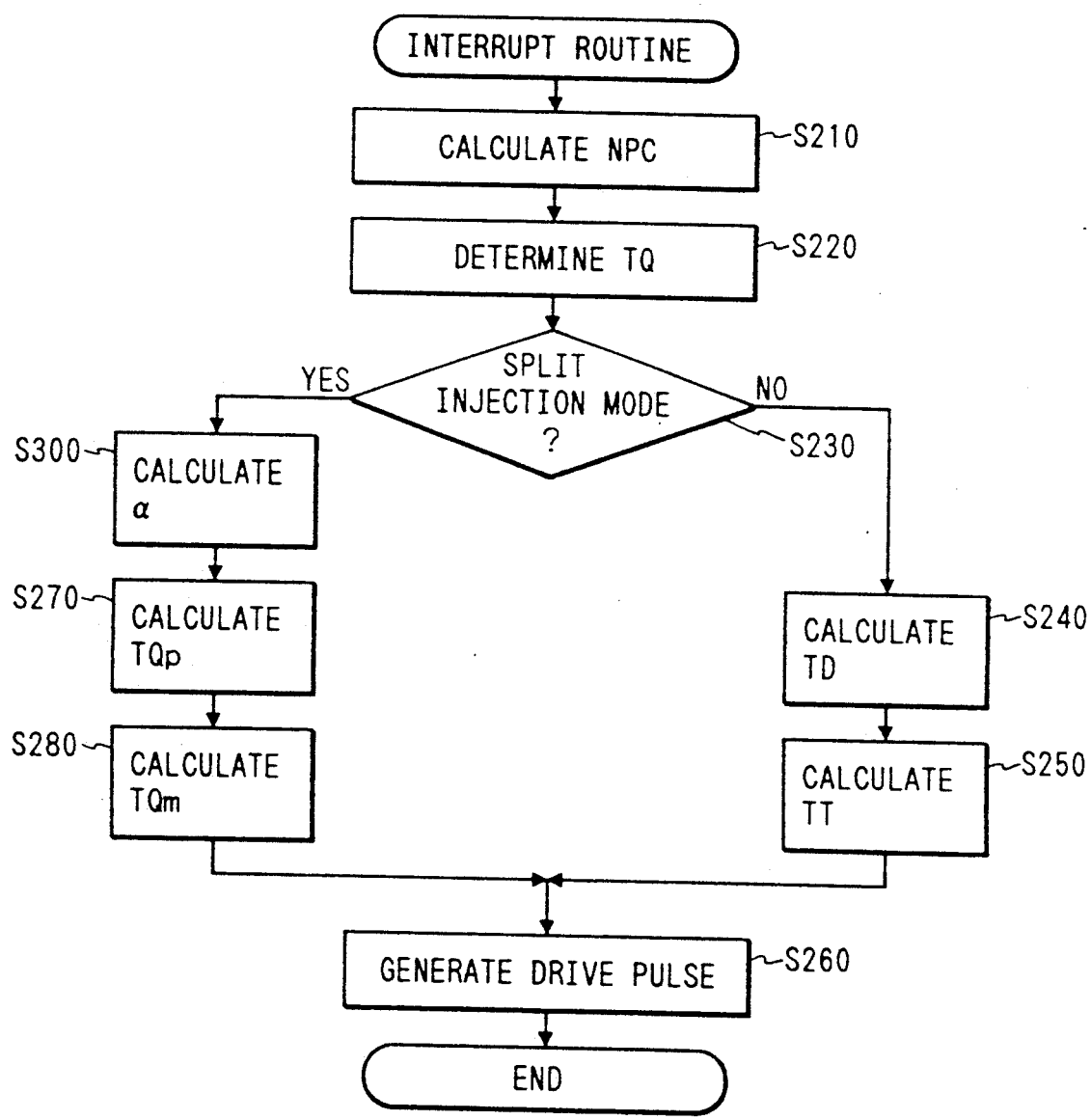
FIG. 14 is a flowchart of an interrupt routine for controlling a fuel injector according to the third embodiment.

According to a third embodiment of the present invention, the ratio of quantities of the pre-jet and the main jet of fuel is made variable. More specifically, as shown in FIG. 13, the ratio $\alpha$ ($=Qp/Qm$) of a quantity Qp of pre-jet fuel to a quantity Qm of main jet fuel varies depending on an engine parameter, e.g., the coolant temperature. The ratio $\alpha$ is controlled according to an interrupt routine for controlling a fuel injector as shown in FIG. 14. The interrupt routine shown in FIG. 14 differs from the interrupt routine shown in FIG. 8 in that a step S300 for calculating the ratio $\alpha$ is added, and the pre-jet time period TQp and the main jet time period TQm are calculated according to the ratio $\alpha$. In the third embodiment, the split fuel injection mode is carried out depending on the coolant temperature at cold engine startup.

Figure 15:
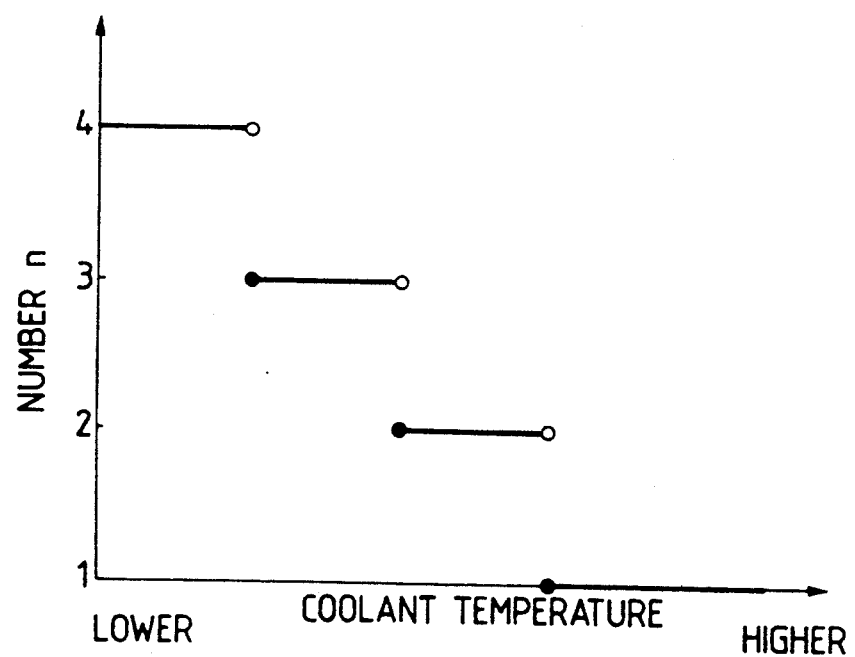
FIG. 15 is a graph showing a map for determining the number of fuel jets to be injected in a split fuel injection mode according to a fourth embodiment of the present invention.
Figure 16:
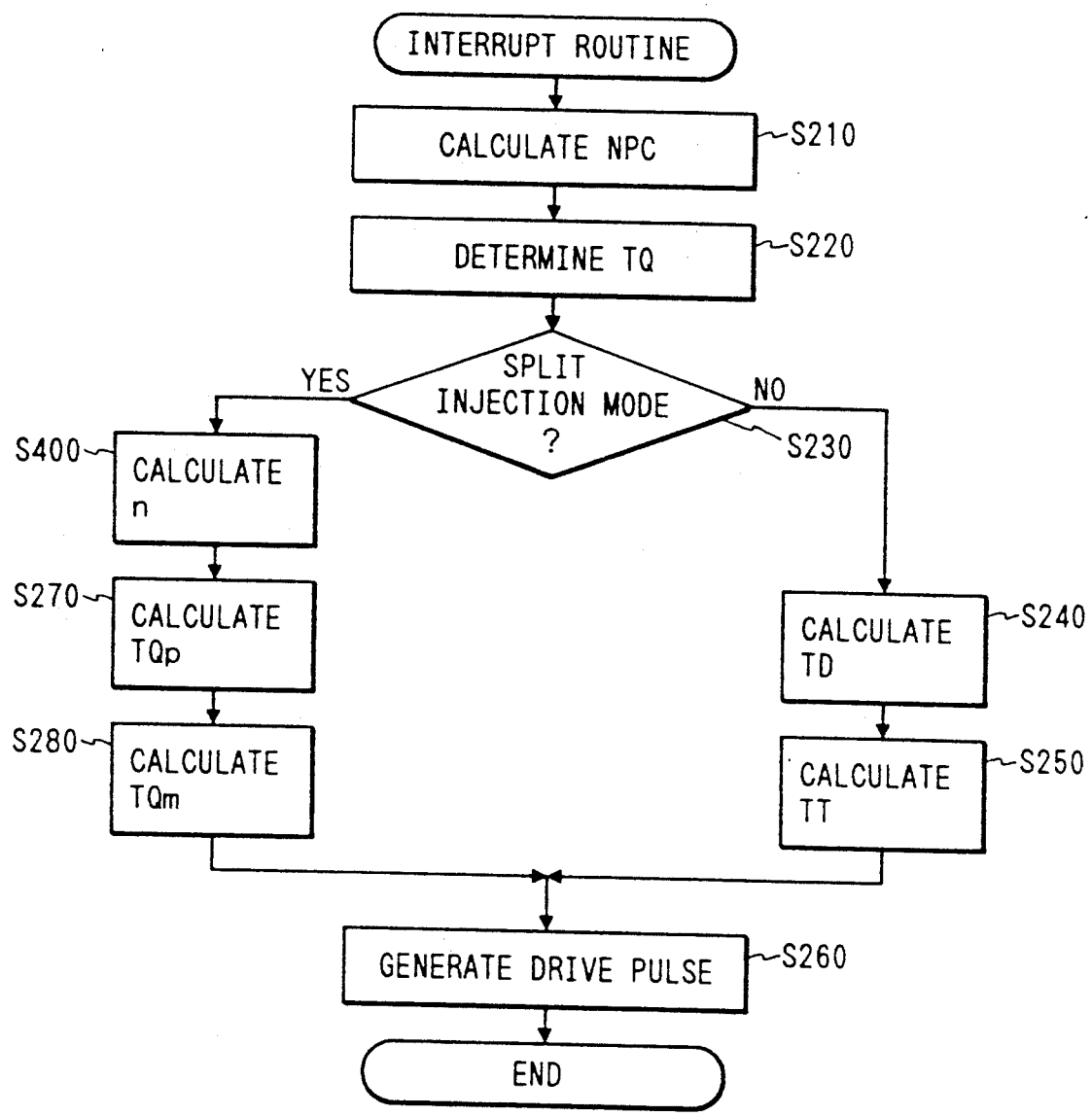
FIG. 16 is a flowchart of an interrupt routine for controlling a fuel injector according to the fourth embodiment.

According to a fourth embodiment of the present invention, the number of fuel jets to be injected in a split fuel injection mode is made variable. More specifically, as shown in FIG. 15, the number n of fuel jets to be injected in a split fuel injection mode varies in a range from n=1 to n=4 depending on an engine parameter, e.g., the coolant temperature. The number n is controlled according to an interrupt routine for controlling a fuel injector as shown in FIG. 15. The interrupt routine shown in FIG. 15 differs from the interrupt routine shown in FIG. 8 in that a step S400 for calculating the number n is added, and the pre-jet time period TQp and the main jet time period TQm are calculated according to a ratio which has experimentally been determined with respect to the numbers n=2, 3, 4. The lower the coolant temperature, the larger the number n of fuel jets, with a more activated condition developed in the cylinder.

The fourth embodiment may be combined with the third embodiment, so that both the number n and the ratio $\alpha$ may be variable and calculated depending on a certain engine parameter, typically, the coolant temperature.

The ratio $\alpha$ and the number n may be determined by not only the coolant temperature, but also the intake air temperature, the engine rotational speed, the pressure in the combustion chamber, the temperature in the combustion chamber, or the temperature of the exhaust gas.

In the third and fourth embodiments, the ECU may include a plurality of capacitors for discharging high voltages to actuate the fuel injector to inject respective fuel jets into the cylinder.

In the above embodiments, both the pre-jet and the main jet of fuel are injected in synchronism with Ne pulses generated by the crankshaft angle sensor 53. However, only either one of the pre-jet and the main jet of fuel may be injected in synchronism with Ne pulses generated by the crankshaft angle sensor 53. Particularly, the main jet of fuel may not necessarily be injected in synchronism with Ne pulses because an easily ignitable, activated condition has already been developed in the cylinder by the injected pre-jet of fuel, providing a wide ignitable range in the cylinder for optimum main-jet fuel injection timing.

The principles of the present invention are not limited to the common-rail-type fuel injection control system, but also applicable to electronically controlled fuel injection control systems and mechanically operated fuel injection control systems.

Figure 19:
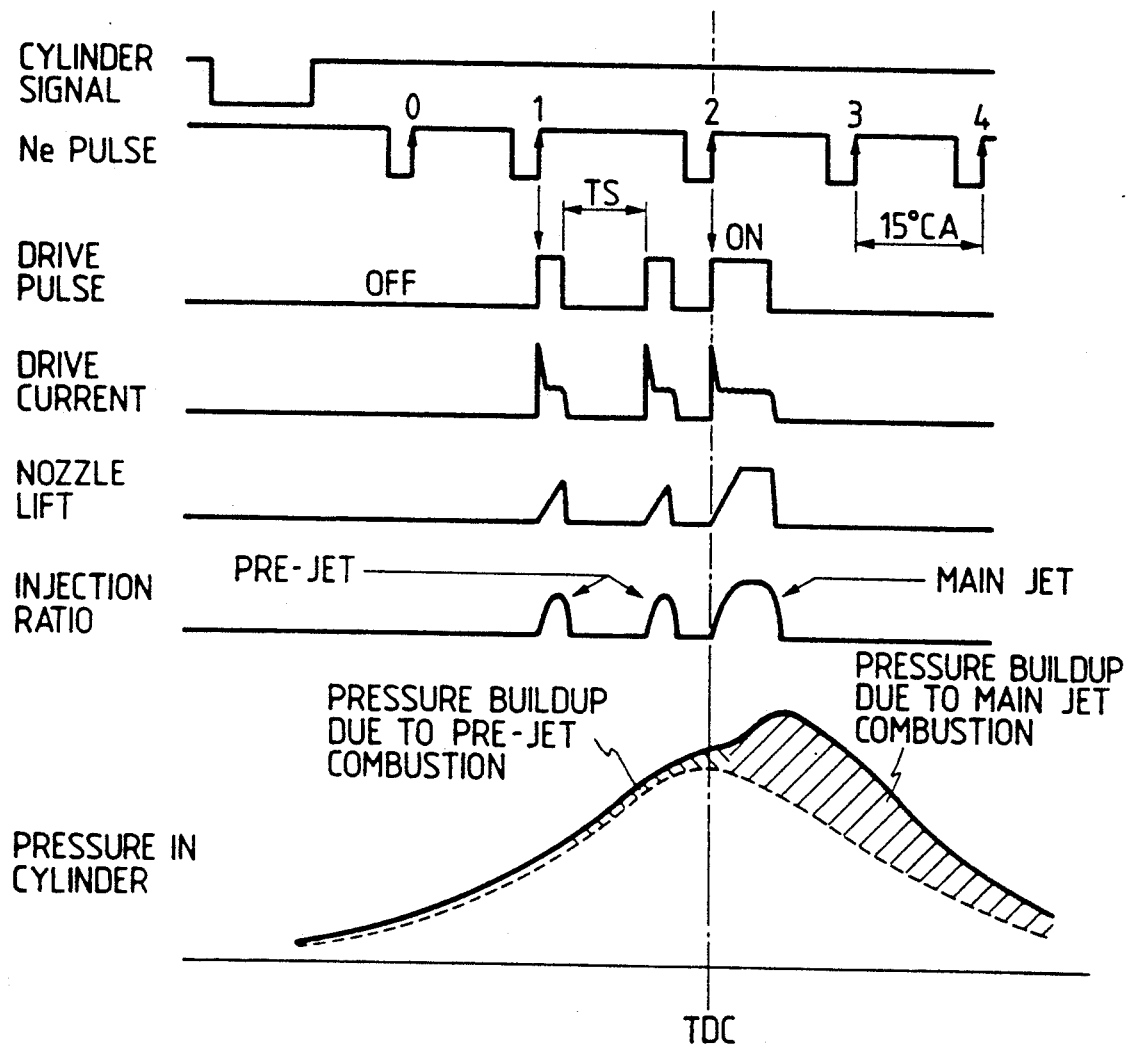
FIG. 19 is a diagram showing the relationship between the split fuel injection and the pressure in a cylinder according to the fifth embodiment.

A fifth embodiment of the present invention will be described below with reference to FIGS. 17 through 19.

According to the fifth embodiment, a plurality of pre-jets of fuel are injected at given intervals of time from the Ne pulse No. 1 generated by the crankshaft angle sensor 53, for producing a kindling that is reliably available to ignite a subsequently injected main jet of fuel.

Figure 17:
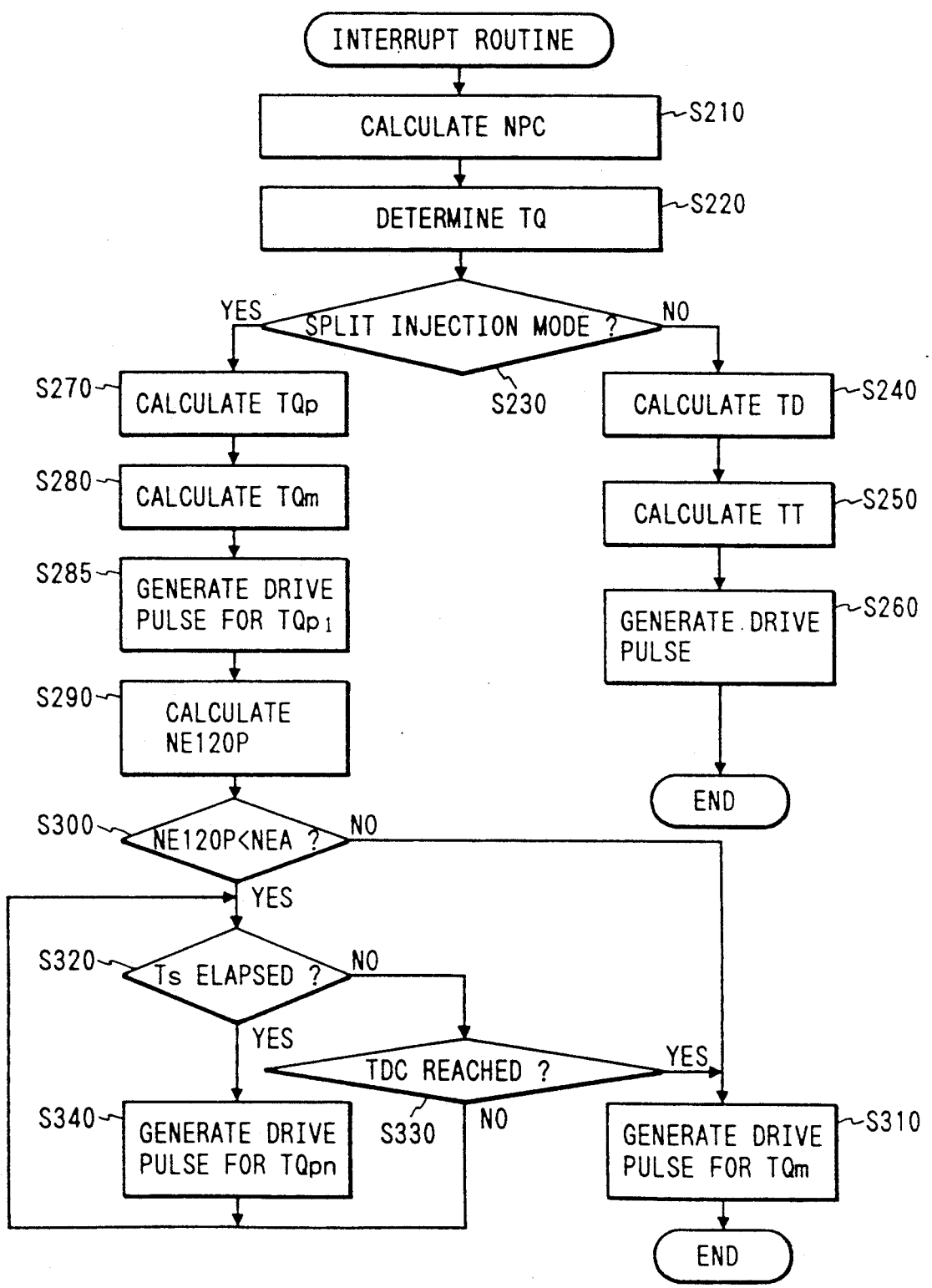
FIG. 17 is a flowchart of an interrupt routine for controlling a fuel injector according to a fifth embodiment of the present invention.

FIG. 17 shows an interrupt routine for controlling the fuel injector 3. The interrupt routine shown in FIG. 17 is carried out periodically in synchronism with the rotation of the crankshaft. The interrupt routine includes steps S210, S220, S230, S240, S250, S260 which are identical to those shown in FIG. 8. In the step S270, the CPU 41 determines a first pre-jet time period TQp1 and second and following pre-jet time periods TQpn. The first pre-jet time period is selected to be $\frac{1}{4}$ of the target energization period TQ determined in the step S220 as with the first embodiment. Because the high-voltage energy stored in the capacitor 63 has already been discharged and the peak current Ip is not available, a corrective time period "Cp" is added to calculate the second and following pre-jet time period TQpn. For the same reason, the main jet time period TQm is calculated by adding a corrective time period "Cm" in the step S280. The pre-jet time periods TQp1, TQpn and the main jet time period TQm are calculated as follows:

$$TQp1 = (1/4)*TQ.$$
$$TQpn = (1/4)*TQ + Cp \ (n = 2, 3 \ldots). \quad (4)$$
$$TQm = (3/4)*TQ + Cm. \quad (5)$$

Based on the pre-jet time period TQp1 thus calculated, the CPU 41 generates, in a step S285, a drive pulse in synchronism with the Ne pulse No. 1 (BTDC), as shown in FIG. 18B.

Then, the CPU 41 calculates, in a step S290, an average engine rotational speed (hereinafter referred to as an "instantaneous engine rotational speed") NE120P in a compression stroke over a crankshaft angle of 120° CA immediately prior to BTDC, from Ne pulses supplied at 15° CA intervals from the crankshaft angle sensor 53. The CPU 41 compares the instantaneous engine rotational speed NE120P with a predetermined reference engine rotational speed NEA in a step S300. The reference engine rotational speed NEA is determined by a period of time Th in which a kindling produced by the preceding pre-jet of fuel continues to be effective for ignition. An experiment conducted by the inventors indicates that the period of time Th is 40 msec., and the reference engine rotational speed NEA is correspondingly 100 rpm.

If NE120P>NEA in the step S300, i.e., if the engine rotational speed upon cranking is sufficiently high, the CPU 41 starts to generate a drive pulse for the main jet time period TQm, in synchronism with the Ne pulse No. 2 which corresponds to TDC, in a step S310. Since the time period between the Ne pulses Nos. 1 and 2 is shorter than th time period Th, the main jet of fuel is injected into the cylinder within the time period Th in which the kindling developed by the preceding pre-jet of fuel continues to be effective for ignition. Therefore, the injected main jet of fuel is ignited without fail.

If NE120P<NEA in the step S300, i.e., if the engine rotational speed upon cranking is lower than the reference engine rotational speed NEA, then the CPU 41 determines whether a predetermined time period Ts has elapsed from the injection of the preceding pre-jet of fuel in a step S320. If not, then the CPU 41 determines whether the Ne pulse No. 2 is received from the crankshaft angle sensor 53, i.e., whether the piston has reached TDC before the time period Ts elapses, in a step S330.

If the piston has reached TDC before the time period Ts elapses in the step S330, then control goes to the step S310 to generate a drive pulse for the main jet time period TQm.

If the piston has not reached TDC before the time period Ts elapses in the step S330, then control goes back to the step S320. If the time period Ts has elapsed in the step S320, then control proceeds from the step S320 to a step S340. At this time, the piston has not reached TDC even after elapse of the time period Ts from the injection of the preceding pre-jet of fuel. In the step S340, the CPU 41 generates a drive pulse for the pre-jet time period TQpn to inject an intermediate pre-jet of fuel into the cylinder. Stated otherwise, another pre-jet of fuel is injected when the time period Ts has elapsed from the preceding pre-jet of fuel before the Ne pulse No. 2 is received. The other injected pre-jet of fuel is effective to maintain the kindling that has been developed by the ignition of the preceding pre-jet of fuel. The time period Ts is selected to be shorter than the time period Th. In this embodiment, the time period Ts is 32 msec.

After the step S340, control returns to the step S320. The step S340 is repeated until the Ne pulse No. 2 is received before the time period Ts (=32 msec.) elapses from the preceding intermediate pre-jet of fuel. In the event that the engine rotational speed is very low when the diesel engine is cranked, subsequent pre-jets of fuel may possibly be injected into the cylinder.

As described above, at cold engine startup, the split fuel injection mode is selected, and one or more pre-jets of fuel are injected into the cylinder depending on the engine rotational speed during the compression stroke. As a result, as shown in FIG. 19, a small amount of pre-jet fuel injected into the cylinder, which does not lower the temperature of air in the cylinder with the heat of vaporization, is ignited, producing a kindling prior to TDC. The kindling thus produced continues to be present in the cylinder until a main-jet of fuel is subsequently injected into the cylinder. The subsequently injected main-jet fuel is then reliably ignited and burned upon contact with the kindling. The diesel engine can therefore be started reliably even when the engine rotational speed is low upon cranking due to a low battery energy at cold engine startup. In FIG. 19, the diesel engine operates in a compression stroke at an engine rotational speed of 90 rpm when the engine is cranked at a temperature of −15° C. While two pre-jets of fuel are shown as being injected in FIG. 19, three or more pre-jets of fuel may be injected if the cranking engine rotational speed is lower.

The above advantages of the fifth embodiment can be accomplished because not only the split fuel injection mode is performed at cold engine startup, but also the number of pre-jets of fuel is increased under certain conditions to maintain a kindling until a main jet of fuel is subsequently injected.

Inasmuch as the first pre-jet of ink is injected in synchronism with the rotation of the crankshaft, the split fuel injection mode can be carried out stably with accurate timing even when the engine rotational speed suffers rapid variations as upon engine cranking. Accordingly, the engine startup capability is improved stably at all times.

In the fifth embodiment, the CPU 41 calculates the instantaneous engine rotational speed NE120P in the step S290, and determines whether the instantaneous engine rotational speed NE120P is lower than the reference engine rotational speed NEA in the compression stroke in the step S300, and if NE120P is higher than NEA, no additional pre-jet of fuel is injected. However, the steps S290, S300 may be dispensed with for the following reason: If the instantaneous engine rotational speed NE120P is high, the Ne pulse No. 2 is received before the time period Ts of 32 msec. elapses from the injection of the first pre-jet of fuel, and control does not go to the step S340, but goes to the steps S330, S310. However, the control sequence shown in FIG. 17 is better in that if it is apparent that a main jet of fuel is injected before a kindling developed by a first pre-jet of fuel injected, then the steps S320, S330 may not be executed, and the burden on the ECU 11 is reduced.

In the above fifth embodiment, the split fuel injection mode is controlled on the basis of the engine starter signal, the engine rotational speed, and the coolant temperature. However, an intake air temperature or an intake air pressure may also be added as a parameter to control the split fuel injection mode. Other parameters may also be used insofar as they can be used to determine whether the diesel engine is to be started at low temperatures requiring the split fuel injection mode.

The reference engine rotational speed NEA of 100 rpm and the time period Ts of 32 msec. in the above embodiment may be varied depending on the environmental conditions and engine type.

Figure 20:
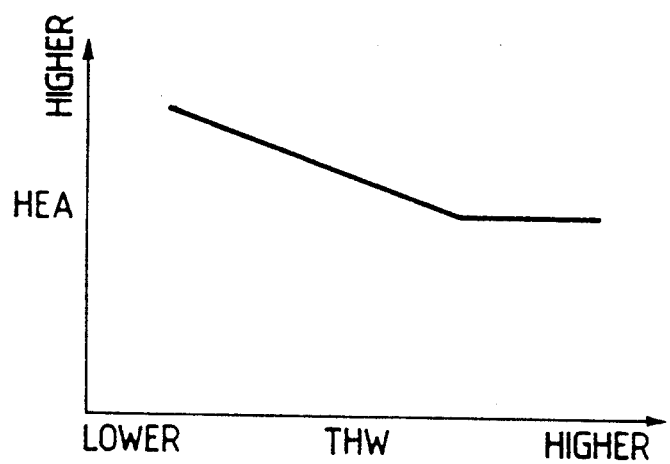
FIG. 20 is a graph showing a map for determining a reference engine rotational speed NEA according to a modification.

For example, the reference engine rotational speed NEA may be determined depending on the coolant temperature THW which is one of the engine parameters, as shown in FIG. 20. In FIG. 20, the lower the coolant temperature, the higher the reference engine rotational speed NEA, making it more likely to inject more pre-jets of fuel. The reference engine rotational speed NEA may be determined according to an arithmetic formula or map interpolation.

Figure 21:
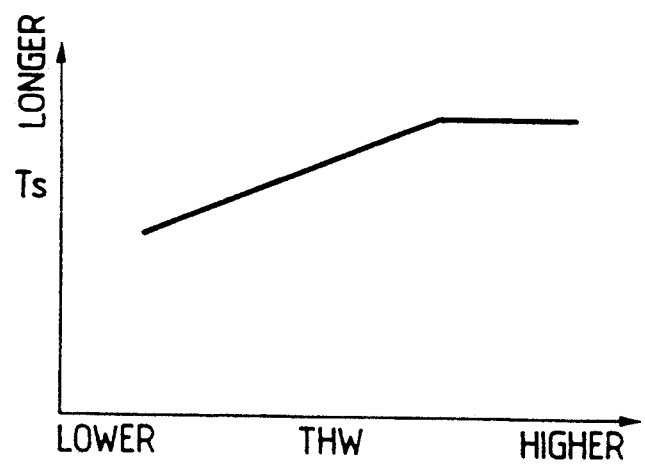
FIG. 21 is a graph showing a map for determining a period of time Ts according to another modification.

The time period Ts may also be determined depending on the coolant temperature THW, as shown in FIG. 21. The time period Ts may also be determined according to an arithmetic formula or map interpolation.

In the fifth embodiment, the total quantity of injected pre-jets of fuel varies from the quantity of ¼*TQ depending on the number of injected pre-jets of fuel. However, instead of varying the number of injected fuel jets, the number of pre-jets of fuel may be predicted based on the reference engine rotational speed NEA, and the quantities of pre-jets of fuel may be varied so that the total quantity of pre-jet fuel will be constant.

Figure 22:
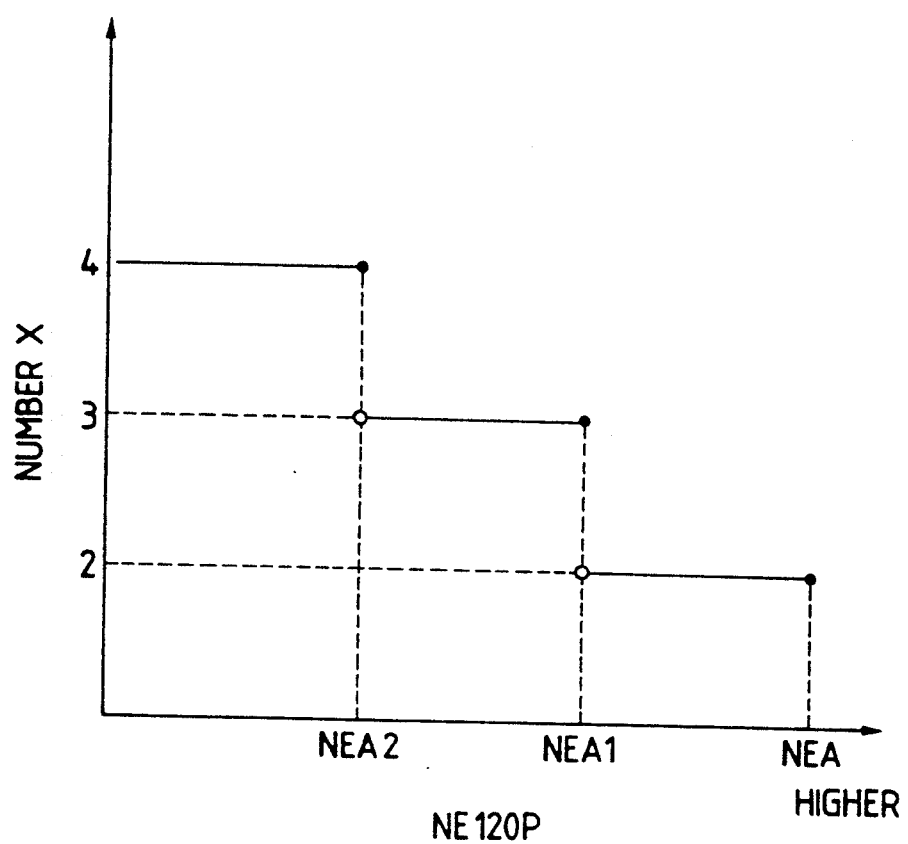
FIG. 22 is a graph showing a map for predicting the number of pre-jets according to still another modification.

More specifically, the number X of pre-jets of fuel is predicted based on the reference engine rotational speed NEA from a map shown in FIG. 22, and the quantity of fuel (¼*TQ) which would be injected for a single pre-jet may be divided by the number X, for thereby determining pre-jet time periods TQp1, TQp2, TQp3, . . . . As no high-voltage energy of the capacitor is available for injecting second and subsequent pre-jets of fuel, a corrective time Cp is added to calculate the pre-jet time periods as follows:

$$TQpl = (1/X)*\{(1/4)*TQ\}.$$
$$TQpn = (1/X)*\{(1/4)*TQ\} + Cp \ (n = 2, 3 \ldots). \quad (6)$$

Figure 23:
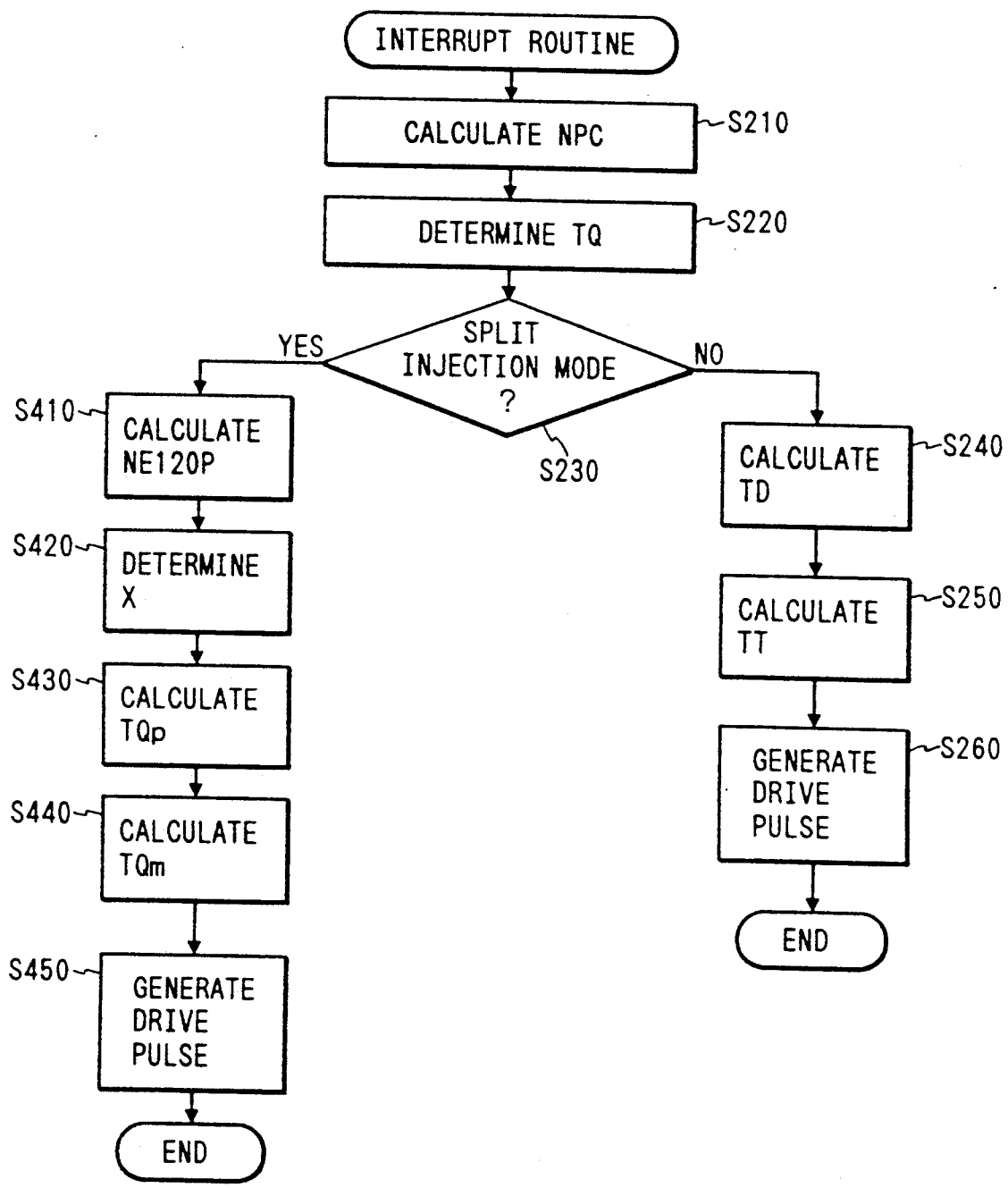
FIG. 23 is a flowchart of an interrupt routine for controlling a fuel injector according to the still other modification.
Figure 24:
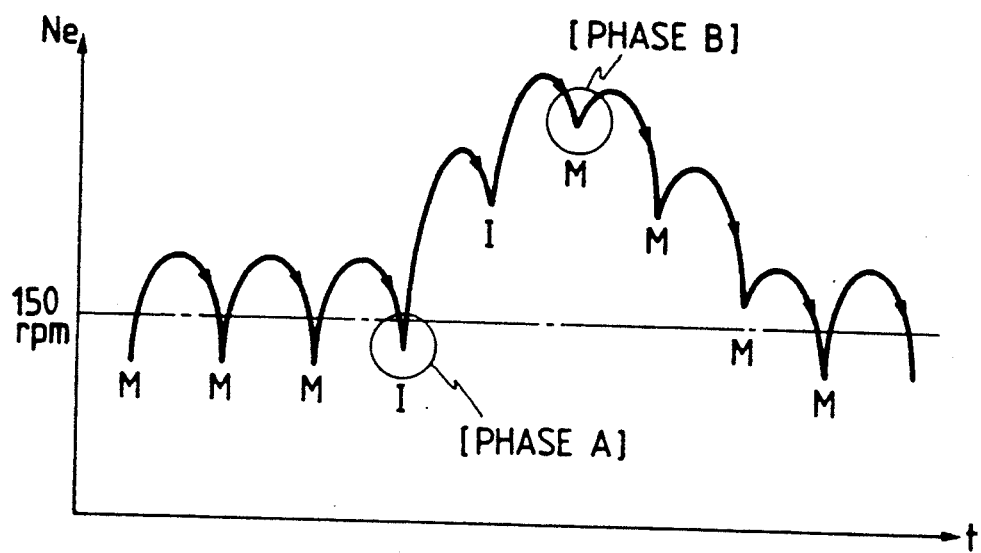
FIG. 24 is a diagram illustrative of ignitions and misfires at cold engine startup.
Figure 26:
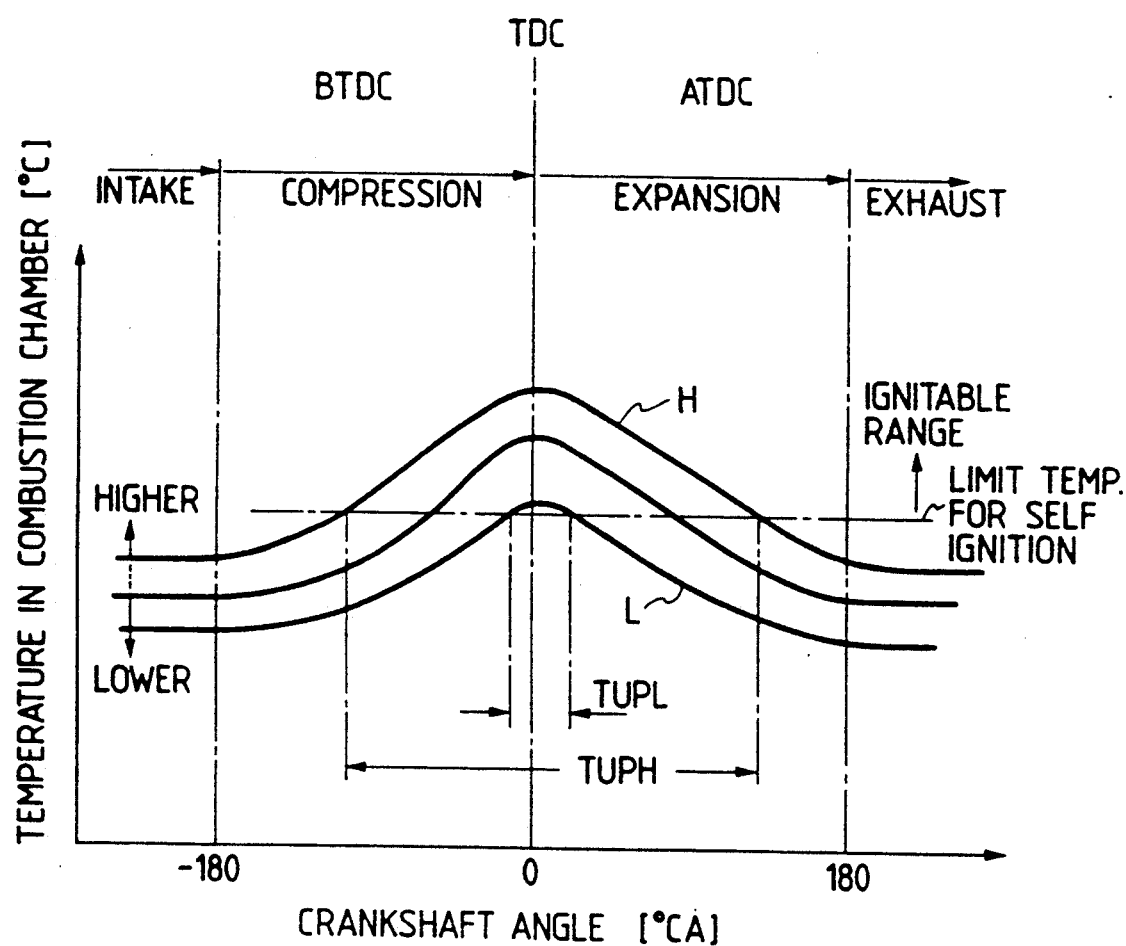
FIG. 26 is a diagram illustrative of the relationship between intake air temperatures and combustion chamber temperatures as the crankshaft angle varies.

In this modification, the fuel injector is controlled according to an interrupt routine as shown in FIG. 23. The interrupt routine shown in FIG. 23 includes steps S210, S220, S230, S240, S250, S260 which are the same as those shown in FIG. 8. If the split fuel injection mode is ON in the step S230, the CPU 41 calculates an instantaneous engine rotational speed NE120P in a step S410. Then, the CPU 41 determines the number X of pre-jets of fuel from the map shown in FIG. 22 in a step S420. Thereafter, the CPU 41 calculates pre-jet time periods TQp1, TQpn according to the equations (6) in a step S430, and also calculates a main jet time period TQm according to the equation (5) in a step S440. Then, the CPU 41 generates drive pulses for injecting the pre-jets of fuel in a step S450. Intervals between the pre-jets of fuel to be injected may be determined by calculating the period of time required for the crankshaft to rotate through 15° CA from the instantaneous engine rotational speed NE120P, and dividing the calculated period of time by the number X. Alternatively, each of the pre-jets of fuel may be injected at an interval of 32 msec. as with the steps S320 through S340 of the fifth embodiment (see FIG. 17).

Although certain preferred embodiments of the present invention have been shown and described in detail, it should be understood that various changes and modifications may be made therein without departing from the scope of the appended claims.

What is claimed is:

1. A fuel injection control system for injecting fuel directly into a combustion chamber of a diesel engine, comprising:
    angular position detecting means for producing an angular position signal each time a crankshaft of the diesel engine rotates through a predetermined angle;
    startup detecting means for detecting a startup condition of the diesel engine;
    pre-jet injecting means for injecting a pre-jet of fuel into the combustion chamber in synchronism with the angular position signal produced by said angular position detecting means when the startup condition of the diesel engine is detected by said startup detecting means; and
    main-jet injecting means for injecting a main jet of fuel, which is larger in quantity than said pre-jet of fuel, into the combustion chamber after said pre-jet of fuel is injected by said pre-jet injecting means when the startup condition of the diesel engine is detected by said startup detecting means.

2. A fuel injection control system according to claim 1, further including normal injecting means for injecting fuel into the combustion chamber at a predetermined time when no startup condition of the diesel engine is detected by said startup detecting means, said predetermined time being indicated by the angular position signal produced by said angular position detecting means and a period of time that has elapsed from the angular position signal.

3. A fuel injection control system according to claim 2, further including rotational speed detecting means for detecting a rotational speed of the diesel engine, said normal injecting means comprising means for calculating said period of time from the rotational speed detected by said rotational speed detecting means to inject fuel at a predetermined angular position of the crankshaft.

4. A fuel injection control system according to claim 1, wherein said pre-jet injecting means comprises means for injecting a plurality of pre-jets of fuel intermittently into the combustion chamber.

5. A fuel injection control system according to claim 4, wherein said pre-jet injecting means comprises means for injecting the pre-jets of fuel into the cylinder at intervals of time from a time represented by the angular position signal produced by said angular position detecting means until the main jet of fuel is injected by said main-jet injecting means.

6. A fuel injection control system according to claim 5, wherein each of said intervals of time is shorter than a period of time in which an activated condition developed in the combustion chamber by a preceding one of the injected pre-jets of fuel remains present in the combustion chamber.

7. A fuel injection control system according to claim 4, further including temperature detecting means for detecting a temperature of the diesel engine, said pre-jet injecting means comprising means for injecting a larger number of pre-jets of fuel into the combustion chamber as the temperature detected by said temperature detecting means is lower.

8. A fuel injection control system according to claim 4, further including rotational speed detecting means for detecting a rotational speed of the diesel engine, said pre-jet injecting means comprising means for injecting a larger number of pre-jets of fuel into the combustion chamber as the rotational speed detected by said rotational speed detecting means is lower.

9. A fuel injection control system according to claim 1, wherein said startup detecting means comprises starter operation detecting means for detecting operation of a starter for starting the diesel engine, said pre-jet and main-jet injection means comprising means for injecting fuel into the combustion chamber while operation of the starter is being detected by said starter operation detecting means.

10. A fuel injection control system according to claim 9, further including timer means for measuring a predetermined period of time, said pre-jet and main-jet injection means comprising means for injecting fuel into the combustion chamber while said predetermined period of time is being measured by said timer means after operation of the starter is not detected by said starter operation detecting means.

11. A fuel injection control system according to claim 1, further including temperature detecting means for detecting a temperature of the diesel engine, said pre-jet and main-jet injection means comprising means for injecting fuel into the combustion chamber when the temperature detected by said temperature detecting means is a predetermined low temperature.

12. A fuel injection control system according to claim 11, further including rotational speed detecting means for detecting a rotational speed of the diesel engine, said pre-jet and main-jet injection means comprising means for injecting fuel into the combustion chamber when the temperature detected by said temperature detecting means is said predetermined low temperature and the rotational speed detected by said rotational speed detecting means is a predetermined low rotational speed.

13. A fuel injection control system according to claim 1, further including rotational speed detecting means for detecting a rotational speed of the diesel engine, said pre-jet and main-jet injection means comprising means for injecting fuel into the combustion chamber when the rotational speed detected by said rotational speed detecting means is a predetermined low rotational speed.

14. A fuel injection control system according to claim 1, further including:
operating condition detecting means for detecting an operating condition of the diesel engine;
target fuel quantity setting means for setting a target quantity of fuel to be injected depending on the operating condition detected by said operating condition detecting means; and
fuel distributing means for distributing the target quantity of fuel set by said target fuel quantity setting means to the quantity of the pre-jet of fuel to be injected by said pre-jet injecting means and the quantity of the main jet of fuel to be injected by said main-jet injecting means according to a predetermined ratio which indicates the main jet of fuel as being larger than the pre-jet of fuel, whereby the quantity of the pre-jet of fuel distributed by said fuel distributing means is injected by said pre-jet injecting means and the quantity of the main jet of fuel distributed by said fuel distributing means is injected by said main-jet injecting means.

15. A fuel injection control system according to claim 1, wherein said pre-jet injecting means comprises means for injecting the pre-jet of fuel into the combustion chamber in synchronism with the angular position signal produced by said angular position detecting means before a piston in the combustion chamber reaches the top dead center in a compression stroke of the diesel engine.

16. A fuel injection control system according to claim 1, wherein said main-jet injecting means comprises means for injecting the main jet of fuel into the combustion chamber in synchronism with the angular position signal produced by said angular position detecting means before a piston in the combustion chamber reaches the top dead center in a compression stroke of the diesel engine.

17. A fuel injection control system according to claim 1, wherein said angular position detecting means comprises means for producing the angular position signal when the crankshaft reaches the predetermined angle before a piston in the combustion chamber reaches the top dead center in a compression stroke of the diesel engine.

18. A fuel injection control system for injecting fuel directly into a combustion chamber of a diesel engine, comprising:
angular position detecting means for producing an angular position signal substantially when a piston in the combustion chamber reaches the top dead center in a compression stroke of the diesel engine;
startup detecting means for detecting a startup condition of the diesel engine;
main-jet injecting means for injecting a main jet of fuel into the combustion chamber substantially when the piston reaches the top dead center in the compression stroke, in synchronism with the angular position signal produced by said angular position detecting means when the startup condition of the diesel engine is detected by said startup detecting means; and
pre-jet injecting means for injecting a pre-jet of fuel, which is smaller in quantity than said main jet of fuel, into the combustion chamber to produce an activated condition in the combustion chamber before said main jet of fuel is injected into the combustion chamber by said main-jet injecting means when the startup condition of the diesel engine is detected by said startup detecting means.

19. A fuel injection control system for injecting fuel directly into a combustion chamber of a diesel engine, comprising:
angular position detecting means for producing an angular position signal each time a crankshaft of the diesel engine rotates through a predetermined angle;
rotational speed detecting means for detecting a rotational speed of the diesel engine;
startup detecting means for detecting a startup condition of the diesel engine;
normal injecting means for injecting fuel into the combustion chamber at a time which is determined based on the angular position signal produced by said angular position detecting means and a period of time that has elapsed from the angular position signal and varies depending on the rotational speed detected by said rotational speed detecting means; and
startup injecting means for injecting a pre-jet of fuel into the combustion chamber at a time which is determined based on the angular position signal produced by said angular position detecting means irrespective of the rotational speed detected by said rotational speed detecting means, and for injecting a main jet of fuel, which is larger in quantity than said pre-jet of fuel, into the combustion chamber subsequently to said pre-jet of fuel, when the startup condition is detected by said startup detecting means.

20. A fuel injection control system for injecting fuel directly into a combustion chamber of a diesel engine, comprising:
angular position detecting means for producing an angular position signal each time a crankshaft of the diesel engine rotates through a predetermined angle;
rotational speed detecting means for detecting a rotational speed of the diesel engine;
startup detecting means for detecting a startup condition of the diesel engine;
normal injecting means for injecting fuel into the combustion chamber at a time which is determined based on the angular position signal produced by said angular position detecting means and a period of time that has elapsed from the angular position signal and varies depending on the rotational speed detected by said rotational speed detecting means; and
startup injecting means for injecting a main jet of fuel into the combustion chamber at a time which is determined based on the angular position signal produced by said angular position detecting means irrespective of the rotational speed detected by said rotational speed detecting means, and for injecting a pre-jet of fuel, which is smaller in quantity than said main jet of fuel, into the combustion chamber prior to said main jet of fuel, when the startup condition is detected by said startup detecting means.

* * * * *